United States Patent
Toriu et al.

[11] Patent Number: 6,124,685
[45] Date of Patent: Sep. 26, 2000

[54] METHOD FOR CORRECTING DISTORTION OF IMAGE DISPLAYED ON DISPLAY DEVICE, DISTORTION DETECTING UNIT, DISTORTION CORRECTING UNIT AND DISPLAY DEVICE HAVING SUCH DISTORTION CORRECTING UNIT

[75] Inventors: Takashi Toriu, Kawasaki; Satoshi Kouyama, Hyogo, both of Japan

[73] Assignee: Fujitsu Limited, Kawasaki, Japan

[21] Appl. No.: 08/985,083

[22] Filed: Dec. 4, 1997

[30] Foreign Application Priority Data

Jan. 20, 1997 [JP] Japan ..................... 9-008016

[51] Int. Cl.[7] .............. G09G 1/04; H01J 29/56; H04N 3/22
[52] U.S. Cl. .......... 315/370; 315/369; 348/806; 382/275
[58] Field of Search .................. 315/369, 370; 348/180, 746, 806; 382/275

[56] References Cited

U.S. PATENT DOCUMENTS

| | | | |
|---|---|---|---|
| 5,434,595 | 7/1995 | Macaulay | 345/207 |
| 5,675,380 | 10/1997 | Florent et al. | 348/251 |

FOREIGN PATENT DOCUMENTS

| | | |
|---|---|---|
| 53-149712 | 12/1978 | Japan . |
| 1-302474 | 12/1989 | Japan . |
| 4-23692 | 1/1992 | Japan . |
| 5-66739 | 1/1992 | Japan . |
| 6-327019 | 11/1994 | Japan . |
| 6-335033 | 12/1994 | Japan . |
| 7-264611 | 10/1995 | Japan . |

*Primary Examiner*—Seungsook Ham
*Assistant Examiner*—John Patti
*Attorney, Agent, or Firm*—Staas & Halsey LLP

[57] ABSTRACT

A method for correcting distortion of an image displayed on a screen of a display device. The method includes steps of taking a picture of a test pattern displayed on the screen of the display device in an adjusting state, extracting distortion information representing distortion of the test pattern from an image obtained from a result of the above step, extracting additional information as a distortion characteristic, the distortion information being approximately represented by a plurality of basic information items which are known and the additional information coupled to the basic information items, storing the additional information in a storage unit, reproducing the distortion information using the additional information stored in the storage unit and the plurality of basic information items when an image is displayed on the screen of the display device, and controlling the display device based on the reproduced distortion information so that the distortion is canceled.

24 Claims, 24 Drawing Sheets

DISTORTED CURVE

DISTORTION
CORRECTING WAVE

METHOD FOR CORRECTING DISTORTION OF IMAGE DISPLAYED ON DISPLAY DEVICE, DISTORTION DETECTING UNIT, DISTORTION CORRECTING UNIT AND DISPLAY DEVICE HAVING SUCH DISTORTION CORRECTING UNIT

BACKGROUND OF THE INVENTION

1. Field of the Invention

The present invention generally relates to a system for correcting distortion of an image displayed on a display device, and more particularly to a method for correcting distortion of an image displayed on a screen of a display unit so that the distortion is canceled, a distortion detecting unit for detecting such distortion of an image, a distortion correcting unit for correcting distortion of an image displayed on a screen of a display unit based on the detected distortion of the image and a display apparatus having such a distortion correcting unit.

2. Description of the Related Art

As shown in FIG. 1, in a display device 10 using a CRT (Cathode-Ray Tube), when a rectangle S is displayed on a screen 10a without correction of distortion of a displayed image, the rectangle S is distorted so that four corners of the rectangle S are expanded. This phenomenon is caused, as shown in FIG. 2, by the difference between the curvature center of a curved tube surface (corresponding to the display screen 10a) of the CRT 11 and the deflection center of an electron-beam emitted from an electron gun.

There are basic patterns of the distortion of the rectangle image as shown in FIGS. 3A, 3B, 3C and 3D. The distortion shown in FIG. 3A is often called a pin-cushion distortion. In the pin-cushion distortion, lines facing each other are distorted so as to be curved in opposite directions (see FIG. 1). The distortion shown in Fig. 3B is often called a bowed distortion. In the bowed distortion, lines facing each other are distorted so as to be curved in the same direction. The distortion shown in FIG. 3C is often called a trapezoidal distortion. In the trapezoidal distortion, lines facing each other are distorted so as to be inclined in opposite directions. The distortion shown in FIG. 3D is often called a rhomboidal distortion. In the rhomboidal distortion, lines facing each other are distorted so as to be inclined in the same direction. Although, in FIGS. 3A, 3B, 3C and 3D, the right and left lines of the rectangle are distorted, the upper and lower lines of the rectangle have the same distortion patterns.

In addition, as shown in FIG. 4, lines L1, L2, L3, L4, L5, L6, L7, L8 and L9 are displayed on the screen 10a of the display device 10 without correction of distortion of displayed images. These lines should be arranged at constant intervals in a direction parallel to the horizontal direction. However, due to the lack of correction of distortion of the displayed images, as the lines get closer to the circumference of the screen 10a, the distance between lines increases (deterioration of the vertical linearity). This is also caused by the difference between the curvature center of the tube surface of the CRT 11 and the deflection center of the electron beam.

Conventionally, to correct such distortion of images on the screen (the rectangular screen), correction current applied to a deflection unit (a deflection coil) is adjusted while a test pattern displayed on the screen is being observed. For example, in a case where the pin-cushion distortion as shown in FIG. 3A is corrected, the distorted lines are regarded as being parabolic-wave (square-wave) shaped lines. The correction current is applied to the deflection unit so that the parabolic-wave shaped lines are canceled. The distortion of the rectangle S displayed on the screen 10a as described above is caused by a structure of the CRT 11. Thus, due to adjustment of the correction current supplied to the deflection unit, the distortion may be corrected.

However, the distortion of the image displayed on the screen 10a of the display device 10 may be caused by other factors, such as variation of a mounting position of the electron gun in the CRT, variation of a mounting position of the deflection yoke, influence of a fine adjustment magnet, instability of a high-voltage source and loss of a deflection current. Due to the above factors, a line on the screen 10 may be distorted slightly but complicatedly as a line L shown in FIG. 5. Such complex distortion is not eliminated by the conventional method for adjusting the correction current supplied to the deflection unit while a display condition on the screen is being observed.

As a result, in a case where a high-quality image displayed on the screen of a high-definition display device is required, the conventional method for correcting the distortion of images, as described above, can not sufficiently fulfill the requirement.

Thus, methods of finely correcting the complex distortion of images have been proposed (Japanese Patent Laid Open Application Nos. 53-149712, 4-23692, 6-327019 and 7-264611). In the respective proposed methods, a predetermined pattern is displayed on the screen and the difference between a position of each point on the pattern actually displayed on the screen and a corresponding position of a point to be positioned on the pattern is stored as correction data. When an image is displayed, the deflection unit is controlled using the correction data.

However, in the respective methods, conventionally proposed, for correcting the distortion of the displayed image, a large amount of data is needed in order to accurately correct the distortion of the displayed image. The differences between the positions of respective points on the actually displayed image and the positions of corresponding points to be positioned on the image are stored in the correction data. In order to accurately correct distortion of the displayed image, a large amount of correction data must be stored in the display device. As a result, an extensive area for the correction data must be prepared in an internal memory of the display device.

SUMMARY OF THE INVENTION

Accordingly, a general object of the present invention is to provide a novel and useful system for correcting distortion of an image displayed on a display device.

A specific object of the present invention is to provide a method capable of accurately correcting distortion of an image displayed on a display device using a small amount of data.

The above objects of the present invention are achieved by a method for correcting distortion of an image displayed on a screen of a display device, said method comprising the steps of: (a) taking a picture of a test pattern displayed on the screen of said display device in an adjusting state; (b) extracting distortion information representing distortion of the test pattern from an image obtained from a result of the step (a); (c) extracting additional information as a distortion characteristic, the distortion information extracted in step (b) being approximately represented by a plurality of basic information items which are known and the additional information coupled to the basic information items; (d)

storing the additional information in a storage unit; (e) reproducing the distortion information using the additional information stored in said storage unit and said plurality of basic information items when an image is displayed on the screen of said display device; and (f) controlling said display device based on the distortion information reproduced in step (e) so that the distortion is canceled.

According to the above method, the information representing the distortion of the test pattern is approximately represented using a plurality of basic information items which are known and the additional information coupled to the basic information item. The additional information is then stored in the storage means. The additional information stored in the storage means and the known basic information are coupled so that the distortion information is approximately reproduced.

Since the basic information items are known, storage of only the additional information will suffice to reproduce the distortion information. Due to selection of proper basic information items, the distortion information can be approximated using a small amount of the additional information.

Each of the basic information items is information which can partially represent the state of the distortion.

Another object of the present invention is to provide a distortion detecting unit employable in the above method.

The object of the present invention is achieved by a distortion detecting unit for detecting distortion of an image displayed on a screen of a display device, said distortion detecting unit comprising: picture means for taking a picture of a predetermined test pattern displayed on the screen of said display device which is controlled under a predetermined state; distortion information extracting means for extracting distortion information representing distortion of the test pattern from an image corresponding to a result obtained by said picture means; and distortion characteristic extracting means for extracting additional information as a distortion characteristic, the distortion information extracted by said distortion information extracting means being approximately represented by a plurality of basic information items which are known and the additional information coupled to the basic information items, wherein the additional information which is the distortion characteristic is output as a detected result.

According to the above distortion detecting unit, the information representing the distortion of the test pattern is approximately represented using a plurality of basic information items which are known and the additional information coupled to the basic information items. The additional information is then output as a detecting result. Since the basic information items are known, storage of only the additional information will suffice to reproduce the distortion information. Due to selection of proper basic information items, the distortion characteristic can be reproduced using a small amount of additional information.

Further, another object of the present invention is to provide a distortion correcting unit employable in the above method.

The object of the present invention is to provide a distortion correcting unit for correcting distortion of an image displayed on a screen of a display device, said distortion correcting unit comprising: storage means for storing additional information as a distortion characteristic, the additional information being obtained by steps of: taking a picture of a test pattern displayed on the screen of said display device under an adjusting state; extracting distortion information representing distortion of the test pattern from an image obtained from a result of the above step; and extracting the additional information, the distortion information extracted in the above step being approximately represented by a plurality of basic information items which are known and the additional information coupled to the basic information items; distortion information reproducing means for approximately reproducing the distortion information using the additional information stored in said storage means and said plurality of basic information items when an image is displayed on the screen of said display device; and control means for controlling said display device based on the distortion information reproduced by said distortion information reproducing means so that the distortion is canceled.

According to the above distortion correcting unit, the distortion information is reproduced using the additional information stored in the storage unit and the basic information items which are known, and the correcting control of the display device is performed based on the reproduced storage information so that the distortion is canceled.

Another object of the present invention is to provide a display device having the above distortion correcting unit.

The object of the present invention is to provide a display device having a display tube displaying an image by electron beams scanning a surface of said display tube and a deflection unit causing the electron beams to scan the surface of said display tube based on a control signal, said display device comprising: storage means for storing additional information as a distortion characteristic, the additional information being obtained by steps of: taking a picture of a test pattern displayed on the screen of said display device under a condition in which said deflection unit is controlled in a predetermined control state; extracting distortion information representing distortion of the test pattern from an image obtained from a result of the above step; and extracting the additional information, the distortion information extracted in the above step being approximately represented by a plurality of basic information items which are known and the additional information coupled to the basic information items; distortion information reproducing means for approximately reproducing the distortion information using the additional information stored in said storage means and said plurality of basic information items when an image is displayed on the surface of said display tube; and correcting control means for supplying a correcting signal based on the distortion information reproduced by said distortion information reproducing means to said deflection unit so that the distortion is canceled.

According to the above display device, the distortion information is reproduced using the adding information stored as the distortion characteristic in the storage means, and the correcting signal is generated based on the reproduced distortion information so as to be used to cancel the distortion. The deflection unit is controlled based on the correcting signal.

BRIEF DESCRIPTION OF THE DRAWINGS

Other objects, features and advantages of the present invention will be apparent from the following description when read in conjunction with the accompanying drawings, in which.

DESCRIPTION OF THE PREFERRED EMBODIMENTS

A description will be given of a principle of correcting distortion of a displayed image according to the present invention.

Figure 6:
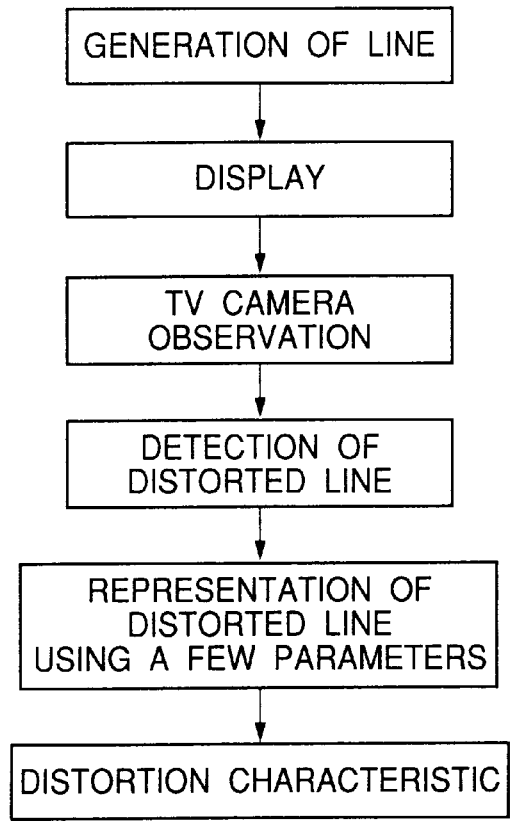
FIG. 6 is a flowchart illustrating a procedure for obtaining a distortion characteristic.

The characteristic of the distortion of an image displayed on the display device is detected in accordance with a procedure as shown in FIG. 6.

A TV camera is set so as to face a screen of the display device. In this state, a line is displayed on the screen (GENERATION OF LINE and DISPLAY). At this time, one or a plurality of kinds of distortion: the pin-cushion distortion, the bowed distortion, the trapezoidal distortion and the rhomboidal distortion, described above, (see FIGS. 3A–3D) may or may not be corrected.

Figure 8A:
FIG. 8A is a diagram illustrating a distorted line.

The line displayed on the screen is then observed using the TV camera (TV CAMERA OBSERVATION). The line displayed on the screen is curved, as shown in FIG. 8A, based on the distortion characteristic of the display device. Coordinates of points on the curved line (a distorted line) obtained by the observation using the TV camera are calculated, and the distorted line is then represented by a string of the coordinates (DETECTION OF THE DISTORTED LINE). Based on the string of coordinates, the distortion characteristic is represented by a few parameters (REPRESENTATION OF DISTORTED LINE USING A FEW PARAMETERS).

Figure 7:
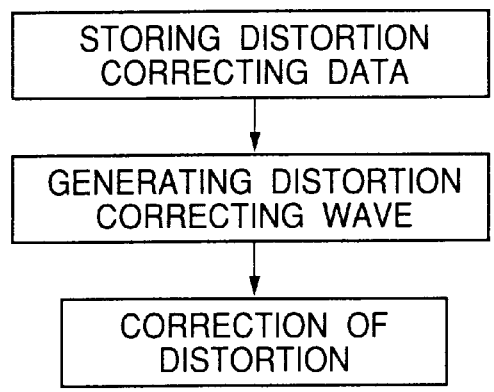
FIG. 7 is a flowchart illustrating a procedure for correcting the distortion.

In the display device, the distortion of a displayed image is corrected in accordance with a procedure as shown in FIG. 7.

Figure 8B:
FIG. 8B is a diagram illustrating a correction waveform used to correct the distorted line shown in FIG. 8A.

The distortion characteristic represented by a few parameters as described above is stored as distortion correcting data (STORING DISTORTION CORRECTING DATA). Based on the stored distortion correcting data, a distortion correcting wave which is symmetrical to the distorted line shown in FIG. 8A, as shown in FIG. 8B, is generated (GENERATING DISTORTION CORRECTING WAVE). When a straight line is displayed, the distortion correction wave is superposed on a deflection control signal. As a result, the distortion of an image (the straight line) as shown in FIG. 8A is canceled, and the line is displayed straight on the screen.

The distorted line is detected as follows.

In FIG. 8A, for example, the horizontal direction and the vertical direction are respectively an x-axis direction and a y-axis direction. In this case, the distorted line shown in FIG. 8A is represented a string of coordinates of (x1, y1), (x2, y2), . . . , and (xn, yn), where n is a number of points on the distorted line. While a value of a y-component is being varied from y1 to yn, a value of an x-coodinate corresponding to the value of the y-component is obtained. As a result, the above string of coordinates is obtained.

The distortion may be caused by various factors. Provided that the distortion is caused by M basic factors which are combined in various forms, the distortion can be represented by distortion components each of which is based on one of the M basic factors. Each of the distortion components based on a corresponding one of the M basic factors is referred to as a basic distortion. A curve representing the basic distortion is referred to as a basic waveform. The distortion caused by various factors can be represented by M basic waveforms which are linearly superposed with weights. In this case, the weights to be applied to the basic waveforms represents the distortion characteristic.

The weights to be applied to the basic waveforms are calculated from the string of coordinates representing the distorted line, in accordance with the basic waveforms used, as follows.

First, the basic waveforms can be calculated in accordance with a principal component analyzing method often used in a mathematical statics field. The distortion characteristic can be obtained using the calculated basic waveforms.

Strings of coordinates representing distorted lines are detected from images displayed on many display devices. The string of coordinates corresponding to N points can be represented by values of the x-axis coordinates x1, x2, . . . , and xN obtained while the value of y-components is being varied from y1 to yN one by one. This string of coordinates x1, x2, . . . , and xN is regarded as an N-dimensional vector and referred to as a distortion vector. In a case where data is extracted from K display devices, K distortion vectors:

$$v^1 = (x^1 1, x^1 2, \ldots, x^1 N)$$
$$v^2 = (x^2 1, x^2 2, \ldots, x^2 N)$$
$$\ldots$$
$$v^K = (x^K 1, x^K 2, \ldots, X^K N)$$

are obtained. Based on these vectors, an N×N matrix S is calculated in accordance with $$S = \sum_{i=1}^{k} v^i V^{it}, \tag{1}$$

where $V^{it}$ is a transpose of $V^i$. Eigenvalues of the matrix S and eigenvectors corresponding to the eigenvalues are then calculated. Larger M eigenvalues are chosen from the calculated eigenvalues. Eigenvectors u1, u2, . . . , uM corresponding to the chosen eigenvalues are defined as the basic waveforms.

In this case, providing that a vector v (the distortion vector) representing a string of coordinates detected from each of the display devices is obtained, the distortion characteristic of the display device is represented by M values fk (k=1,2, . . . , M)

$$fk = (v^i, uk) \tag{2}$$

In the above equation, $(v^i, uk)$ is an inner product of the vectors $v^i$ and uk.

In addition, using the distortion characteristic fk, the distorted line v' can be approximated by the following equation in which the basic waveforms are superposed with weights fk $$v' = \sum_{k=1}^{M} fk \cdot uk \tag{3}$$

In the principal component analyzing method, the basic waveforms are calculated from samples of displayed images on many display devices. In accordance with types of display devices and modes in which images are displayed, the optimum basic waveforms are obtained. However, since displayed images must be sampled from many display devices, many steps for calculating the basic waveforms are needed.

To decrease a number of steps for calculating the basic waveforms, constant basic waveforms which depend on neither the types of display devices nor display modes may be decided on. As the constant basic waveforms, B spline functions, sine waves, power functions and other various function systems (groups of a plurality of functions) may be used.

A description will now be given of a case where a predetermined function system is used as the basic waveforms.

A function system {Uk(y): k=1, 2, . . . , K} is defined in an interval [−1, 1]. The relationship between an element Uk of the function system and the basic waveform uk described above is represented by the following equation.

$$Uk(2(i-1)/(N-1)-1) = uk$$

In this case, the distortion characteristic fk is obtained from distortion vectors v observed from the respective display devices is decided on as follows.

Providing that fk is obtained, the distortion vector v' is approximated using fk as follows (in the same manner as in the case of the above equation (3)).

$$v' = \sum_{k=1}^{K} fk \cdot uk \tag{4}$$

In this case, fk is decided so that the observed distortion vector v and the approximated distortion vector v' are as identical to each other as possible. Concretely, fk is decided so that the square of a vector which is the difference between v and v':

$$J = (v-v', v-v') \tag{5}$$

is minimum. Such as fk can be calculated in accordance with the following method.

The equation (4) is substituted in the equation (5). As a result, the following equation (6) is obtained.

$$J = \left( v - \sum_{k=1}^{K} fk \cdot uk, v - \sum_{k=1}^{K} fk \cdot uk \right) \tag{6}$$
$$= (v, v) - 2 \sum_{k=1}^{K} fk(v, uk) + \sum_{k=1}^{K} \sum_{l=1}^{K} fkfl(uk, ul)$$

To decide on an fk so that J is minimum, the equation (6) is differentiated by fk and fk is set at zero. As a result, the following equations concerning fk are obtained.

$$\sum_{l=1}^{K} fl(uk, ul) = (v, uk) \quad (k = 1, 2, \ldots, K) \tag{7}$$

The above equations are simultaneous linear equations concerning K unknown quantities fk (k=1, 2,. . . , K). Numerical solutions of the simultaneous linear equations can be calculated by a generally known computer.

Figure 9:
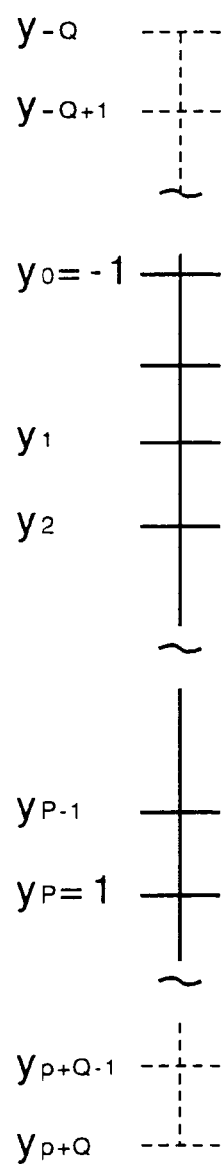
FIG. 9 is a diagram illustrating nodes of intervals used to define the spline function.

The interval [−1, 1] is divided into P intervals [−1, $y_1$], [$y_1$, $y_2$], . . . , [$y_{p-1}$, 1] as shown in FIG. 9. A function which is a polynomial of an order equal to or less than Q in the respective intervals and smoothly continuous at the respective nodes $y_1$, $Y_2$, . . . , $y_{p-1}$ (the differential of an order less than Q is continuous) is referred to as a spline function of the Q-the order in which P−1 nodes are included (see "INTRODUCTION TO SPLINE FUNCTION" Akira Sakurai, Tokyo Dennki Daigaku Publisher). It is known that such a spline function can be represented by linearly superposing a number (Q+P) of B spline functions of the Q-th order with weights.

The number (Q+P) of B spline functions may be used as the function system representing the distortion characteristic. The number (Q+P) of B spline functions $B_{Q;i}(y)$ of the Q-th order (i=−Q, −Q+1, ..., P−1) are defined as follows.

$$B_{Q;i} = \frac{(y_i - y)_+^Q}{(y_i - y_{i+1})(y_i - y_{i+2})\cdots(y_i - y_{i+Q+1})} + \frac{(y_{i+1} - y)_+^Q}{(y_{i+1} - y_i)(y_{i+1} - y_{i+2})\cdots(y_{i+1} - y_{i+Q+1})} + \frac{(y_{i+Q+1} - y)_+^Q}{(y_{i+Q+1} - y_i)(y_{i+Q+1} - y_{i+1})\cdots(y_{i+Q+1} - y_{i+Q})} \quad (8)$$

In the above equation, for convenience, new nodes satisfying the following conditions are added.

$$y_{-Q} < y_{-Q+1} < \cdots < y_0 + 0$$

$$1 = y_p < y_{p+1} < \cdots < y_{p+Q}$$

Using the B spline function $B_{Q;i}$, the equation (7) in which ui (i=−Q, −Q+1, ..., P−1) is substituted for uk is solved by numerical calculation. As a result, the distortion characteristic having (P+Q) values fi is calculated. In addition, based on the calculated distortion characteristic fi, the distorted line can be approximately reproduced in accordance with the above equation (3).

In this case, the basic waveform ui in the equation (3) is the B spline $B_{Q;i}$. According to the equation (8), the basic waveform is a polynomial of an order equal to or less than Q concerning y in the respective intervals. Thus, the sum total represented by the equation (3) can be calculated by summing coefficients in each of orders of y, and the result is a polynomial of an order less than Q in the respective intervals.

In a case where the B spline function is used, the distortion can be approximated by the polynomial of a lower order in each interval, so that it is easy to calculate the distorted waveforms from the distortion characteristic using electronic circuits (small-scale electronic circuitry can be used for calculation).

The sine waveforms may be used as the function system.

In general, a function g(y) defined in an interval [−1, 1] can be approximated by the following Fourier series (see "PHYSICAL MATHEMATICS" Shoichi Koide, Asakura Publisher).

$$\tfrac{1}{2} a_o + \Sigma(a_m \cos(\pi m y) + b_m \sin(\pi m y)) \quad (9)$$

Thus, {1, cos(πmy), sin(πmy) (m=1, 2, ..., k/2−1)} may be used as the basic waveforms.

In general, $a_m$ and $b_m$ representing the distortion are not needed with respect to all values of the subscript m. The distortion can be approximated relatively well using $a_m$ and $b_m$ with respect to an appropriate number of lower subscripts m. Thus, the amount of data can be decreased.

In the above case, $a_0$, $a_m$ and $b_m$ represent the distortion characteristic. When the distorted line is given, these values can be obtained by a Fourier transformation operation (e.g., FFT: Fast Fourier Transformation). In contrast, when the distortion characteristic is given, the distorted line can be approximately reproduced by an inverse Fourier transformation operation.

As has been described above, in a case where the sine waveforms are used as the basic waveforms, the distortion characteristic and the distorted line can be easily obtained using the FFT calculator.

The power functions may be used as the function system.

In this case, power functions {1, y, $y^2$, ..., $y^{k-1}$} are used as the basic function system. In the "DETECTION OF DISTORTED LINE" step, the distorted line in the interval [−1, 1] is observed at N points (y=1, −1+2/(N+1), ..., −1+2i/(N+1)), so that the distortion vector v of the Nth-order formed of x-coordinate values as components is calculated. Next, based on the basic distortion vector uk having the i-th component $(-1+2i/(N+1))^{k-1}$, the simultaneous linear equations (7) are solved using the numerical calculation so that K distortion characteristics fk are obtained.

In addition, the distortion vector v' is calculated using the equation (4), and a voltage to cancel the distortion is then added to the deflection control signal so that the distortion is corrected. In this case, the equation (4) is a polynomial having coefficients fk.

In a case where the power function is used as the basic waveform, the distorted line can be represented by the polynomial having coefficients fk. Thus, when a number (K) of basic waveforms is small, the correcting circuit can be formed of a small-scale circuit.

As has been described above, in the method for correcting the distortion of a displayed image, according to the present invention, a line displayed on the screen of the display device is observed by the camera, and the distorted line obtained from the observation result is represented by a plurality of basic waveforms with weights. A set of weights coupled to the respective basic waveforms is detected as the distortion characteristic. The distortion characteristic is held in the display device, and a correcting waveform used to correct distorted lines on the screen is then generated based on the distortion characteristic.

In a case where the distorted image on the screen of the display device is corrected in accordance with the above method, the distortion characteristic of the image displayed on the screen can be represented using only the weights (the coefficients) coupled to the respective basic waveforms. Thus, an amount of image used to represent the distortion can be decreased.

A description will now be given of an embodiment of the present invention.

Figure 10:
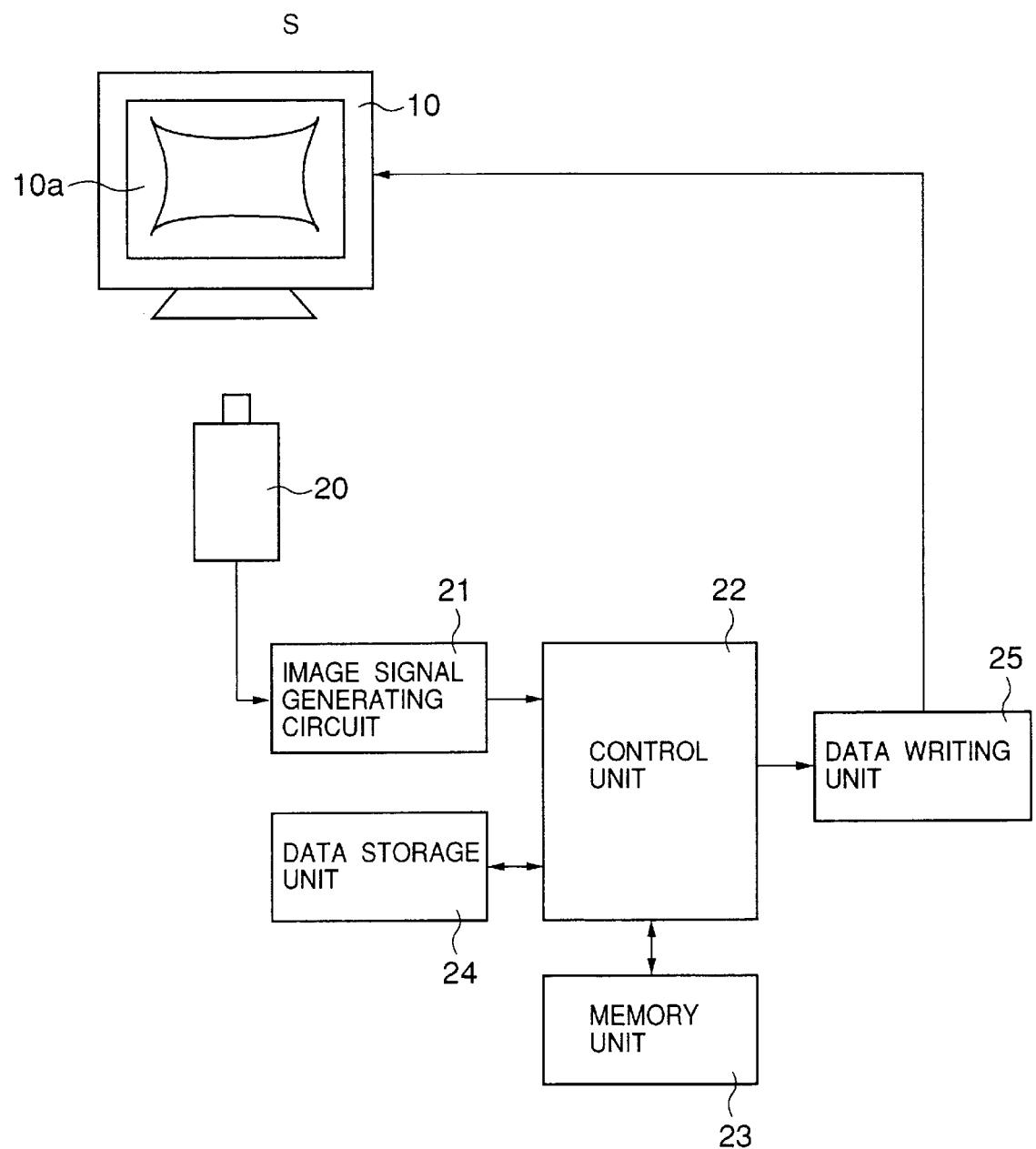
FIG. 10 is a block diagram illustrating a system for detecting distortion of a test pattern displayed on a screen of a display device.

FIG. 10 shows the system for correcting the distortion of an image displayed on the screen of the display device in accordance with the method according to the present invention. The system is used in an image adjusting process in a display device factory.

Referring to FIG. 10, a system has a TV camera 20, an image signal generating circuit 21, a control unit 22, a memory unit 23, a data storage unit 24 and a data writing unit 25. The TV camera 20 is set in front of a produced display device 10 so as to face a screen 10a of the display device 10. The TV camera 20 takes a picture of a test pattern, such as a rectangular pattern S, displayed on the screen 10a. The image signal generating circuit 21 generates dot image signals (representing density) from an imaging signal supplied from the TV camera 20.

The control unit 22 calculates the distortion characteristic representing the distortion of respective lines of the rectangular pattern S displayed on the screen 10a of the display device 10. The memory unit 23 is used to temporarily store the image data and as a work memory, under control of the control unit 22. The data storage unit 24 stores various types of information (basic distortion vectors, distortion vectors, distortion characteristic data and other types of information) which are obtained in processes of the control unit 22.

The data writing unit 25 writes, as distortion correcting data, distortion characteristic data representing the distortion of the image displayed on the screen 10a of the display device 10 in a memory (e.g., EEPROM) in the display device 10. In the display device 10, a deflection unit of a CRT is controlled based on the distortion correcting data stored in the memory so that the distortion of the image is canceled.

Figure 11:
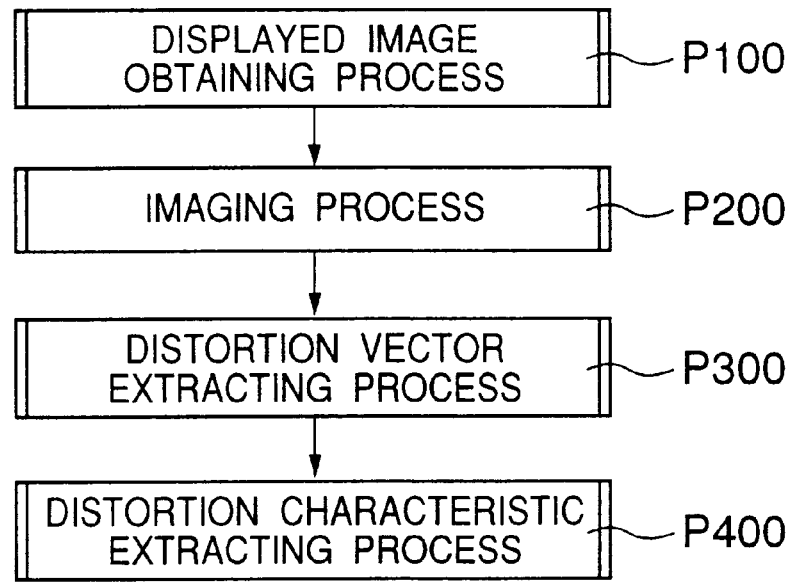
FIG. 11 is a flowchart illustrating a procedure for extracting a distortion characteristic.

The control unit 22 described above performs processes in accordance with a procedure as shown in FIG. 11. That is, a displayed image obtaining process P100, an imaging process P200, a distortion vector extracting process P300 and a distortion characteristic extracting process P400 are successively performed.

A predetermined pattern (e.g, the rectangular pattern S) is displayed on the screen of the display device 10. In an initial state, one or a plurality of types of distortion: the pincushion distortion, the bowed distortion, the trapezoidal distortion and the rhomboidal distortion (see FIGS. 3A–3D) may be or may not corrected.

In the initial state, the TV camera 20 takes a picture of the test pattern displayed on the screen 10a. The image signal generating circuit 21 generates the dot image signal based on the imaging signal from the TV camera 20. In the displayed image obtaining process P100, the dot image signal from the image signal generating circuit 21 is converted into digital image data. The digital image data is then stored in the memory unit 23 (a frame memory).

Figure 12:
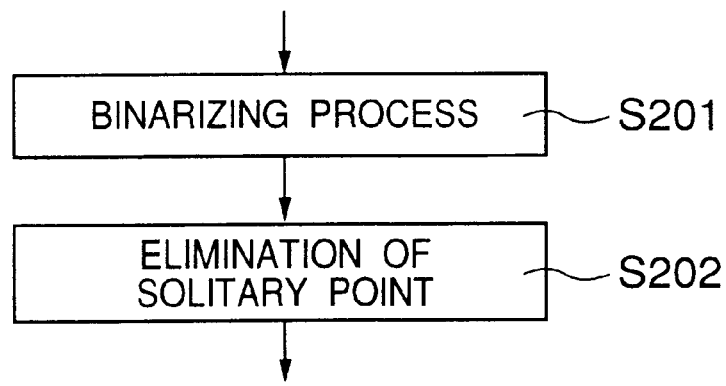
FIG. 12 is a flowchart illustrating a detailed procedure of an image process in the procedure shown in FIG. 11.

The imaging process P200 is performed in accordance with a procedure as shown in FIG. 12. That is, the digital image data stored in the memory unit 23 is binarized (white/black) using a predetermined threshold value and the binary data is expanded in another area (the work memory) of the memory unit 23 (S201). A solitary point eliminating process using a logical filter is applied to the binary data (the binary image data) so that solitary points (noises) are eliminated from the binary image data (S202). As a result, as shown in FIG. 16, the binary image data representing respective lines (e.g., including a line L) of the rectangular pattern S displayed on the screen 10a of the display device 10 is expanded in the memory unit 23.

Figure 13:
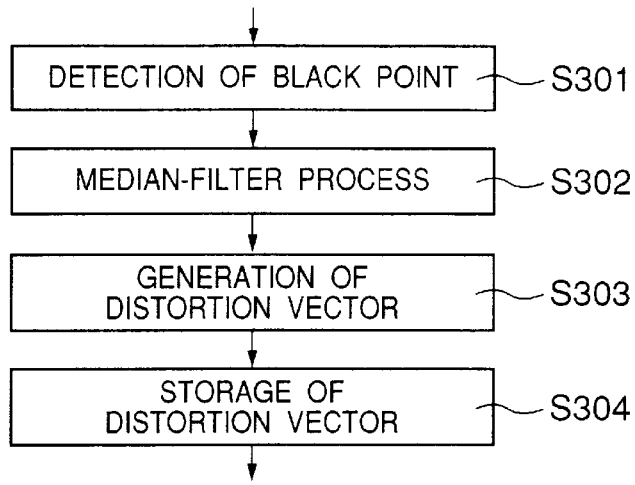
FIG. 13 is a flowchart illustrating a detailed procedure of a distortion vector extracting process in the procedure shown in FIG. 11.

After the binary image data corresponding to each of the lines of the rectangular pattern S displayed on the screen 10a of the display device 10 is expanded in the memory unit 23 in the imaging process P200, the distortion vector extracting process P300 is performed in accordance with a procedure as shown in FIG. 13.

Figure 16:
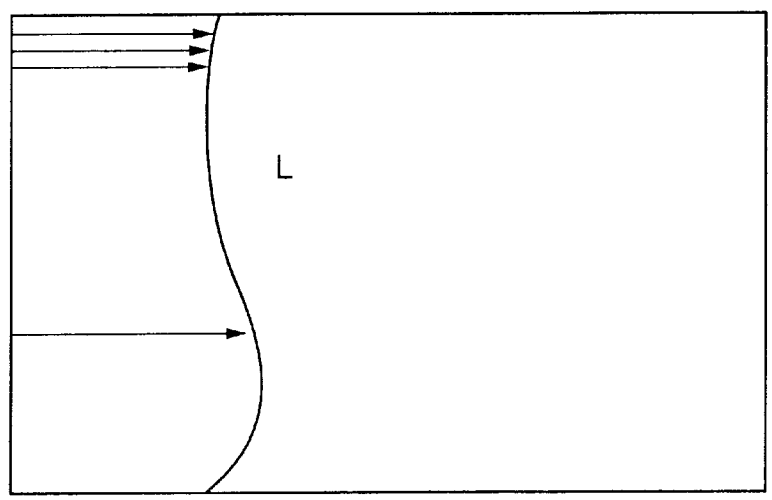
FIG. 16 is a diagram illustrating a process for detecting black points performed in the procedure shown in FIG. 13.
Figure 17A:
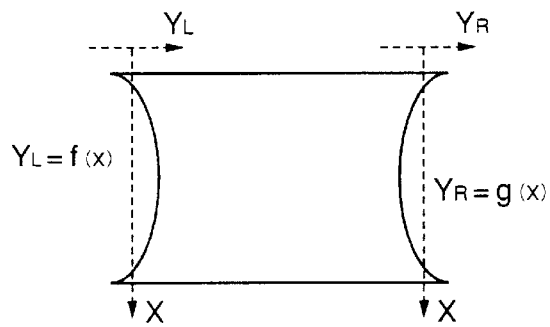
FIGS. 17A, 17B, 17C and 17D are diagrams illustrating functions representing distortion in the horizontal direction.
Figure 17B:
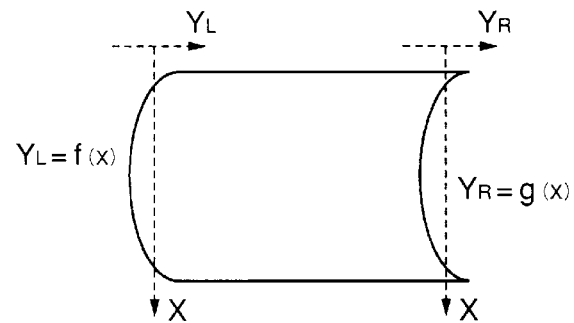
Figure 17C:
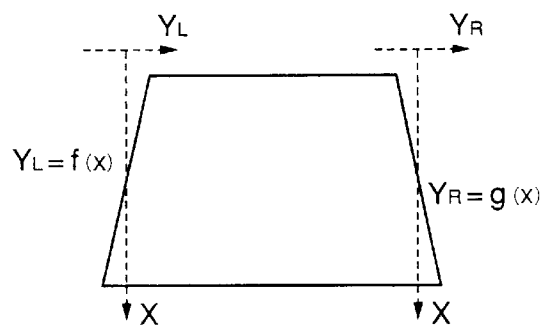
Figure 17D:
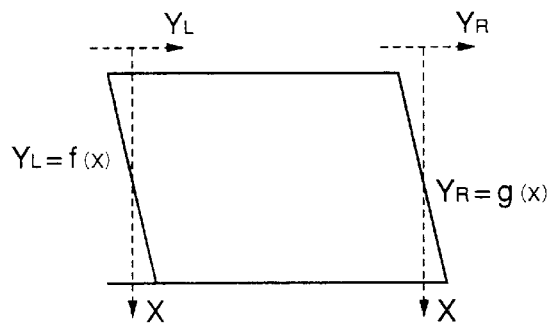

Referring to FIG. 8, the memory area containing the binary image data representing each line L of the rectangular pattern S displayed on the screen 10a of the display device 10 is scanned in a predetermined direction (see FIG. 16). Coordinates (a number of pixels from the left end in FIG. 16) of points (black points) on the line L detected in the scanning are sampled (S301). As a result, a coordinate for each scanning line is obtained. Providing that the number of scanning lines is N, a linear series having N numerical values is obtained. A median-filter process is applied to the linear series so that spike noises are eliminated (S302).

The series of N numerical values to which the median-filter process has been applied is extracted as a distortion vector v $(x_1, x_2, \ldots, X_N)$ (S303). The distortion vector v $(x_1, x_2, \ldots, x)$ is stored in the data storage unit 24 (S304).

Figure 14:
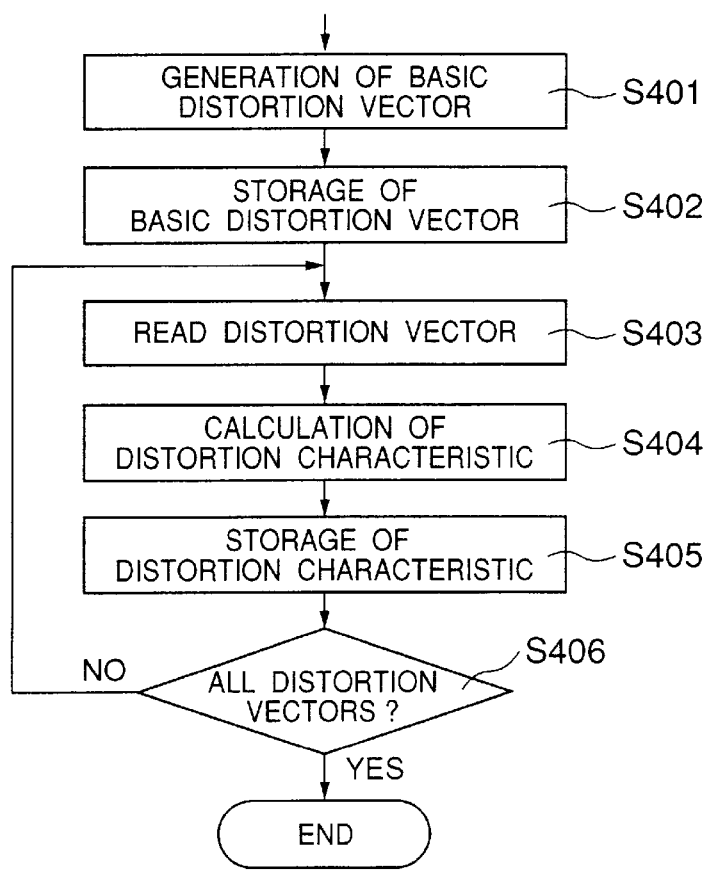
FIG. 14 is a flowchart illustrating a detailed procedure of a distortion characteristic extracting process in the procedure shown in FIG. 11.

After the distortion vector representing the line L displayed on the screen is stored in the data storage unit 24 in the distortion vector extracting process P300, the distortion characteristic extracting process P400 is performed in accordance with a procedure as shown in FIG. 14.

Referring to FIG. 14, first, basic distortion vectors are generated (S401). The basic distortion vectors correspond to the basic waveforms, and are obtained in accordance with the principal component analyzing method. A predetermined function system (the orthogonal function, the B spline function, the sine/cosine function, the power function or the like) may be used as the basic distortion vectors.

In a case where the basic vector is obtained in accordance with the principle component analyzing method, distortion vectors are extracted from a plurality of the display devices which are the same type through the processes P100, P200 and P300. Based on the distortion vectors extracted from the respective display devices, the basic distortion vectors are generated in accordance with a procedure as shown in FIG. 15.

Figure 15:
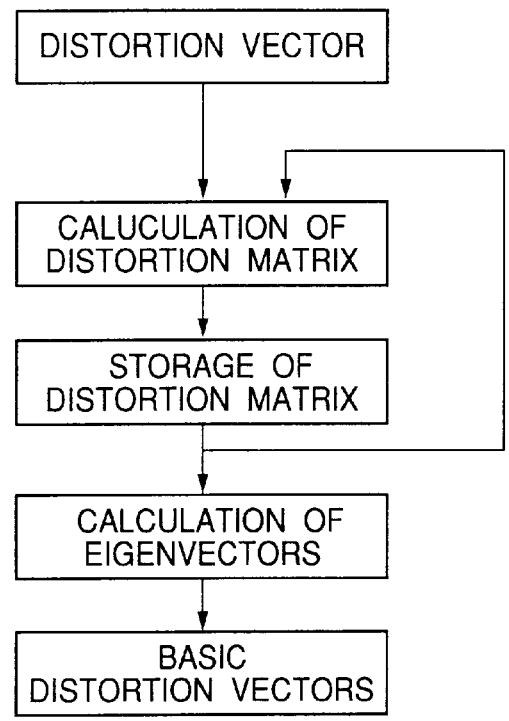
FIG. 15 is a flowchart illustrating another example of a detailed procedure of the distortion characteristic extracting process.

Referring to FIG. 15, a distortion matrix calculating step and a distortion matrix storage step are performed so that an N×N distortion matrix as indicated by the equation (1) is calculated. A storage portion (a predetermined area of the memory unit 23) is zero cleared. Provided that the first distortion vector $v^1$ is defined as $(x^1_1, x^1_2, \ldots, x^1_N)$, $x^1_i x^1_j$ is added to a (i, j) component of the distortion matrix stored in the storage portion (CALCULATION OF DISTORTION MATRIX and STORAGE OF DISTORTION MATRIX). Providing that the m-th distortion vector $v^m$ is defined as $(x^m_1, x^m_2, \ldots, x^m_N)$, $x^m_i x_j$ is added to a component (i, j) component of the distortion matrix stored in the storage portion. This process is repeated for distortion vectors obtained from all the display devices.

Larger K eigenvalues of the N×N matrix S stored in the storage portion (the memory unit 23) and eigenvectors uk (k=1, 2, . . . , K) corresponding to the eigenvalues are calculated. The eigenvectors are used as the basic distortion vectors.

In a case where the function system, such as the B spline function or the orthogonal function, is used as the basic distortion vectors, K functions used as the basic distortion vectors are generated in accordance with a predetermined algorithm.

Returning to FIG. 14, the basic distortion vectors obtained as described above are stored in the data storage unit 24 (S402). In such a state, a distortion vector v of a display device to be adjusted is read out of the storage unit 24 (S403). Using the distortion vector v and the basic distortion vectors uk, the simultaneous equations (7) are numerically solved so that the distortion characteristic is extracted (S404). In a case where the basic distortion vectors are orthogonal to each other, (uk, ul) is equal to zero in the equations (7) when k differs from 1 (k≠1). Thus, the distortion characteristic can be obtained by calculation of only the inner product of the distortion vector and the basic distortion vector.

After the distortion vector having N components is read out of the data storage unit 24 (S403), K Fourier coefficients of lower orders can be calculated as the distortion vector (the distortion characteristic) in an DFT (Discrete Fourier Transformation) process. In this case, it is not necessary to use the basic distortion vectors (the basic waveforms).

The distortion characteristic (the distortion vectors) as calculated above is stored in the data storage unit 24 (S405). Until distortion vectors for all the lines (upper and lower horizontal lines and right and left vertical lines of the rectangular pattern) observed from the screen 10a are obtained, the process S403 through S405 is repeated (S406).

After the distortion vectors of the respective lines displayed on the screen 10a are stored in the data storage unit 24, the control unit 22 supplies the distortion vectors stored in the data storage unit 24 to the data writing unit 25 along with a writing instruction. The data writing unit 25 writes the distortion vectors in the memory (e.g., the EEPROM) in the display device 10 as the correcting data.

When the display unit 10 is used, a correcting signal based on the correcting data stored in the memory is generated and the correcting signal is superposed on the deflection control signal. As a result, the displayed image is corrected so that the image distortion as observed in the image adjusting process in the display device factory is canceled.

A further detailed description will now be given of the process for detecting the distortion characteristic.

For example, the x-axis and the y-axis are respectively set in the vertical direction and the horizontal direction on the screen 10a of the display device 10. As shown in FIGS. 17A, 17B, 17C and 17D, the right line of the rectangular pattern S is defined as $Y_R=g(x)$ and the left line of the rectangular pattern S is defined as $Y_L=f(x)$. The symmetrical distortion $D_S$ is defined as follows.

$$D_s=[f(x)-g(x)]/2 \quad (10)$$

In addition, the asymmetrical distortion $D_u$ is defined as follows.

$$D_u=[f(x)+g(x)]/2 \quad (11)$$

The symmetrical distortion $D_s$ and the asymmetrical distortion $D_u$ are used as information representing the distorted line as described above. In cases where the ideal pin-cushion distortion (see FIG. 17A) is generated and the ideal trapezoidal distortion (see FIG. 17C) is generated, the asymmetrical distortion $D_u$ is approximately equal to zero. In cases where the ideal bowed distortion (see FIG. 17B) is generated and the ideal rhomboidal distortion (see FIG. 17D) is generated, the symmetrical distortion $D_s$ is approximately equal to zero.

Figure 18:
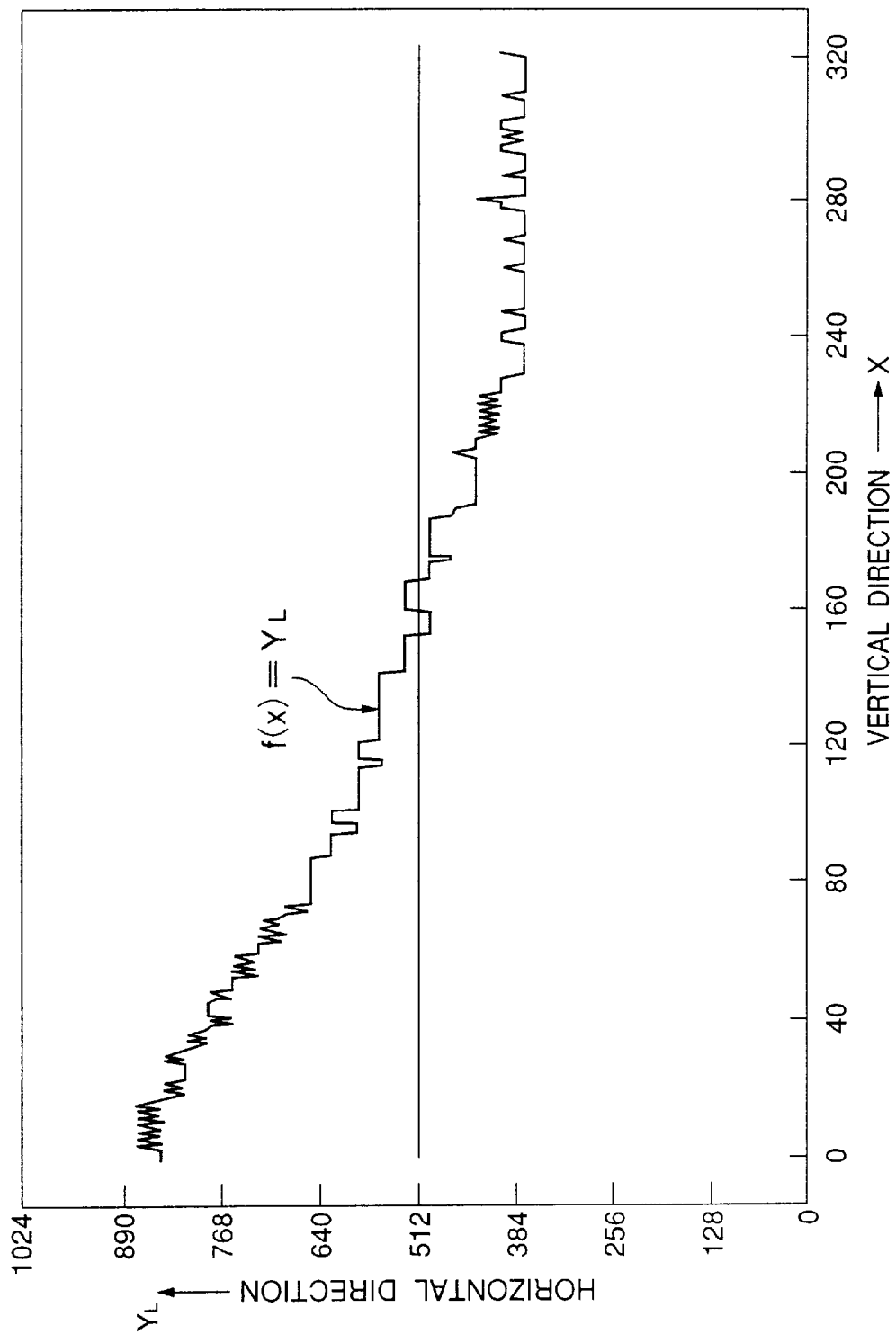
FIG. 18 is a diagram illustrating a function representing a left line of a rectangular test pattern.
Figure 19:
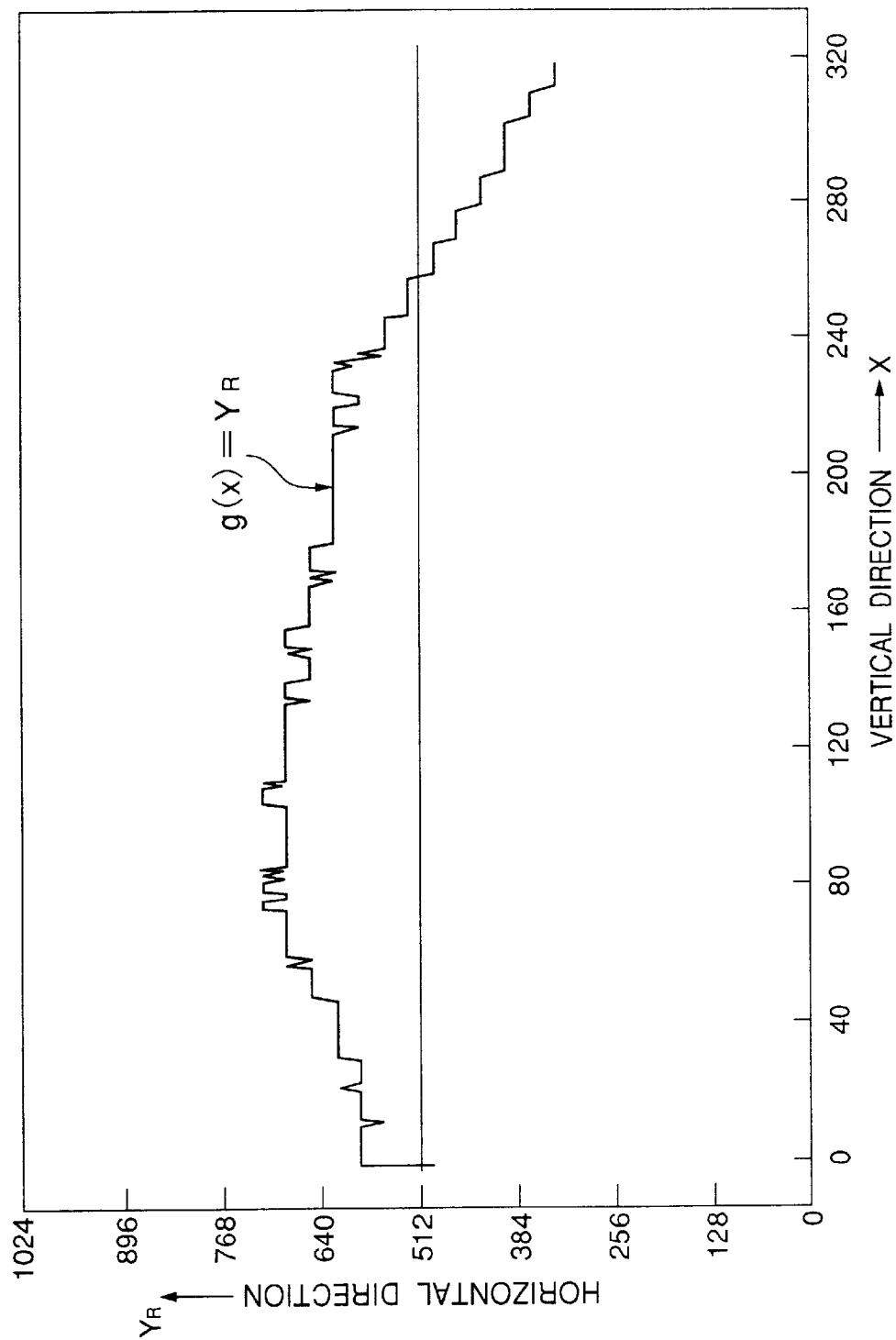
FIG. 19 is a diagram illustrating a function representing a right line of the rectangular test pattern.

The TV camera 20 takes a picture of the rectangular pattern S displayed on the screen of the display device 10 so that image data corresponding to the rectangular pattern S is obtained (expanded in the memory unit 23). The formula f(x) representing the left line of the rectangular pattern S is obtained from the image data. The formula f(x) is graphed as shown in FIG. 18. The formula g(x) representing the right line of the rectangular pattern S is obtained from the image data. The formula g(x) is graphed as shown in FIG. 19. In FIGS. 18 and 19, the y-axis ($Y_L$, $Y_R$) corresponds to the horizontal direction on the screen. The x-axis corresponds to the vertical direction on the screen. An equation $Y_L$ ($Y_R$)= 512 represents a correction target line. By increasing the value of $Y_L$ ($Y_R$), the rectangular pattern S is moved toward the right side of the screen. In the x-axis, a point at the upper end of the screen corresponds to zero "0" and the lower end of the screen is set at "320" The distance between the upper end and the lower end is equally divided.

Figure 20:
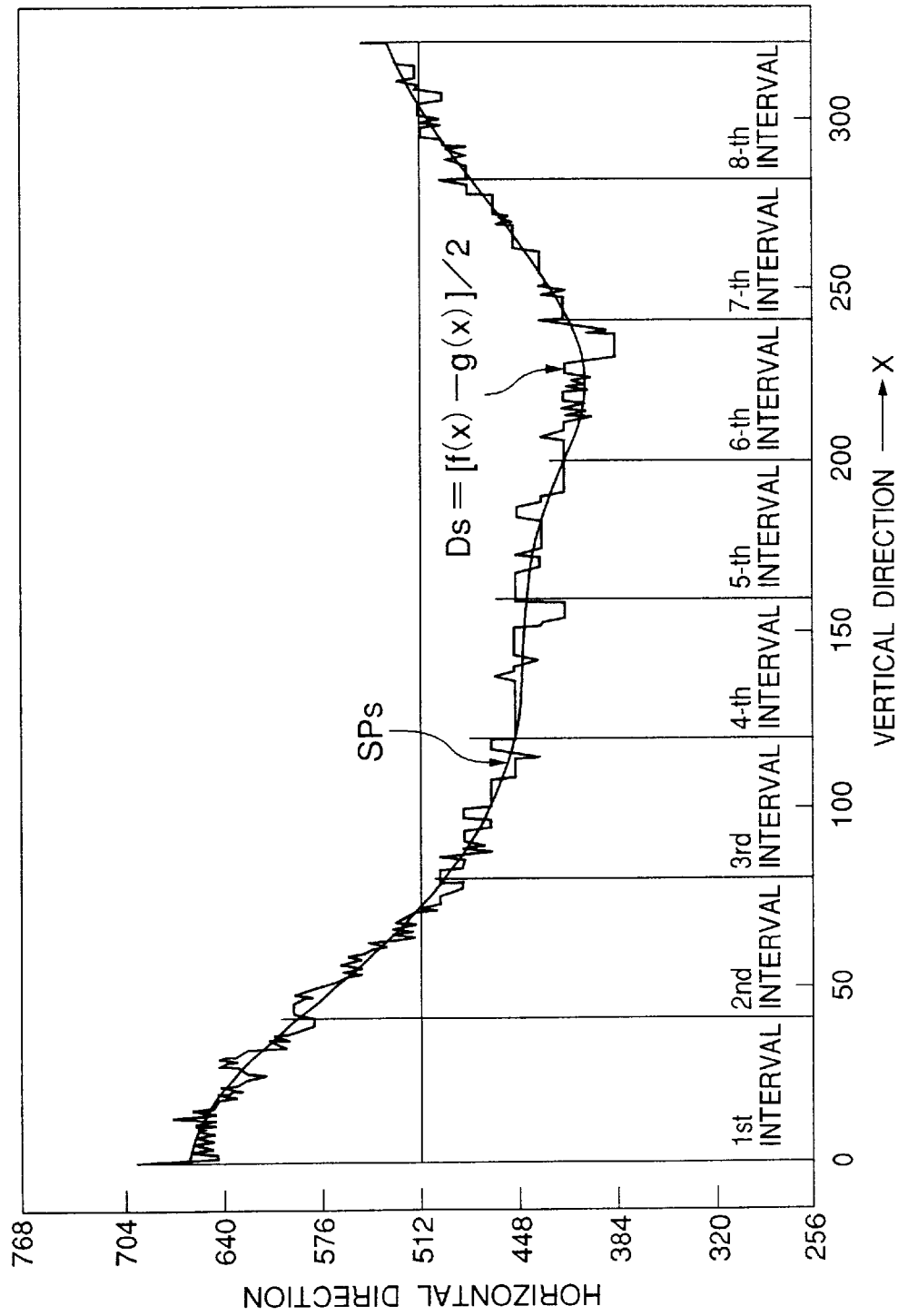
FIG. 20 is a diagram illustrating a graph representing symmetrical distortion.
Figure 21:
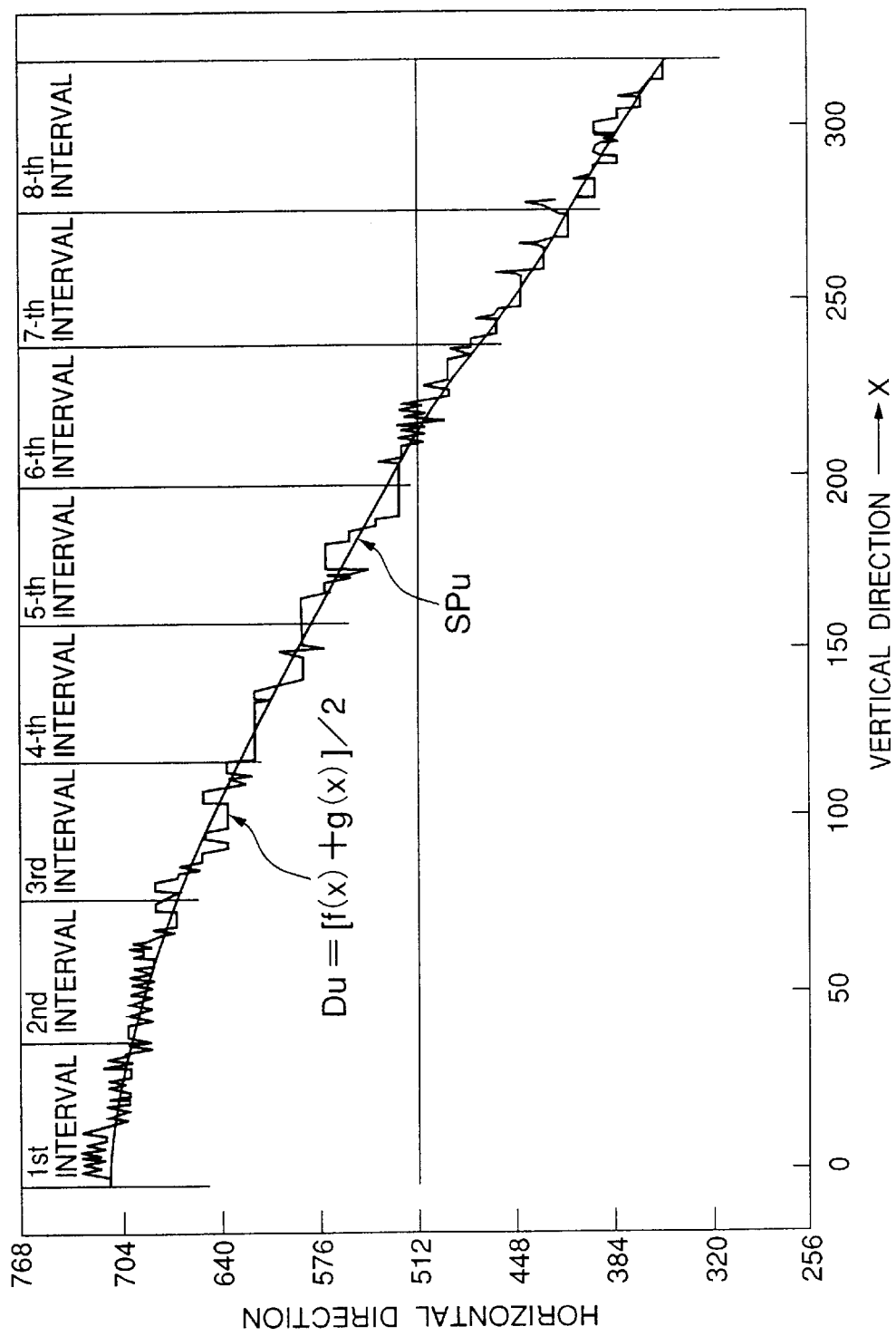
FIG. 21 is a diagram illustrating a graph representing asymmetrical distortion.

In this case, the symmetrical distortion $D_s$ (=[f(x)−g(x)]/2) is graphed as shown in FIG. 20. In addition, the asymmetrical distortion $D_u$ (=[g(x)+f(x)]/2) is graphed as shown in FIG. 21. In FIGS. 20 and 21, the x-axis is divided into, for example, eight intervals, and the symmetrical distortion $D_s$ and the asymmetrical distortion $D_u$ in the respective intervals are approximated by a quadratic function (the spline function: the basic function). The approximation is performed in accordance with the method of least squares under a condition where the functions are smoothly connected at boundaries between the intervals. As a result, coefficients of quadratic functions represent the symmetrical distortion $D_s$ and the asymmetrical distortion $D_u$ in the respective intervals.

For example, in a case of the symmetrical distortion shown in FIG. 20, coefficients A, B and C of the following quadratic function of x which varies from 0 to 1 in the respective intervals are obtained as indicated in TABLE-1.

$$Y=(A-512)x^2+(B-512)x+C \quad (12)$$

TABLE 1

|  | A | B | C |
|---|---|---|---|
| 1st interval | 458 | 499 | 661 |
| 2nd interval | 536 | 391 | 594 |
| 3rd interval | 541 | 438 | 496 |
| 4-th interval | 519 | 497 | 451 |
| 5-th interval | 488 | 510 | 443 |
| 6-th interval | 561 | 463 | 418 |
| 7-th interval | 525 | 561 | 418 |
| 8-th interval | 488 | 587 | 480 |

A spline curve $SP_S$ represented by superposition of the quadratic functions (the spline functions) identified by the above coefficients is shown in FIG. 20. That is, a curve of the symmetrical distortion $D_s$ is approximated by the spline curve $SP_S$.

In a case of the asymmetrical distortion $D_u$ shown in FIG. 21, coefficients A, B and C of the following quadratic function of x which varies from 0 to 1 in the respective intervals are obtained as indicated in TABLE-2.

$$Y=(A-512)x^2+(B-512)x+C \quad (13)$$

TABLE 2

|  | A | B | C |
|---|---|---|---|
| 1st interval | 499 | 515 | 712 |
| 2nd interval | 501 | 490 | 702 |
| 3rd interval | 516 | 467 | 669 |
| 4-th interval | 503 | 475 | 627 |
| 5-th interval | 516 | 457 | 581 |
| 6-th interval | 496 | 466 | 531 |
| 7-th interval | 527 | 435 | 470 |
| 8-th interval | 498 | 465 | 407 |

A spline curve SPU which is represented by superposition of the quadratic functions identified by the above coefficients in the respective intervals is formed as shown in FIG. 21. That is, the asymmetrical distortion $D_u$ is approximated by the spline curve $SP_u$.

In the quadratic functions, a constant value "512" is subtracted from each of the coefficients A and B. This operation is provided to avoid multiplying negative numbers in an actual operation circuit.

The above values of the respective coefficients A, B and C (see TABLE-1 and TABLE-2) are stored, in the data storage unit 24, as the distortion characteristic data (the distortion vectors) representing the distortion of the right and left lines of the rectangular pattern S (the distortion in the horizontal direction) displayed on the screen.

By the same process as in the above case, the distortion characteristic data representing the upper and lower lines of the rectangular pattern S (the distortion in the vertical direction) can be obtained.

Furthermore, the vertical linearity of the image displayed on the screen can be corrected in accordance with the method as described above.

Even if lines expanding in the horizontal direction are displayed on the screen 10a of the display device 10 so that they should be arranged at constant intervals, the intervals of the lines are increased in the circumference of the screen 10a. This phenomenon is the deterioration of the vertical linearity.

Figure 1:
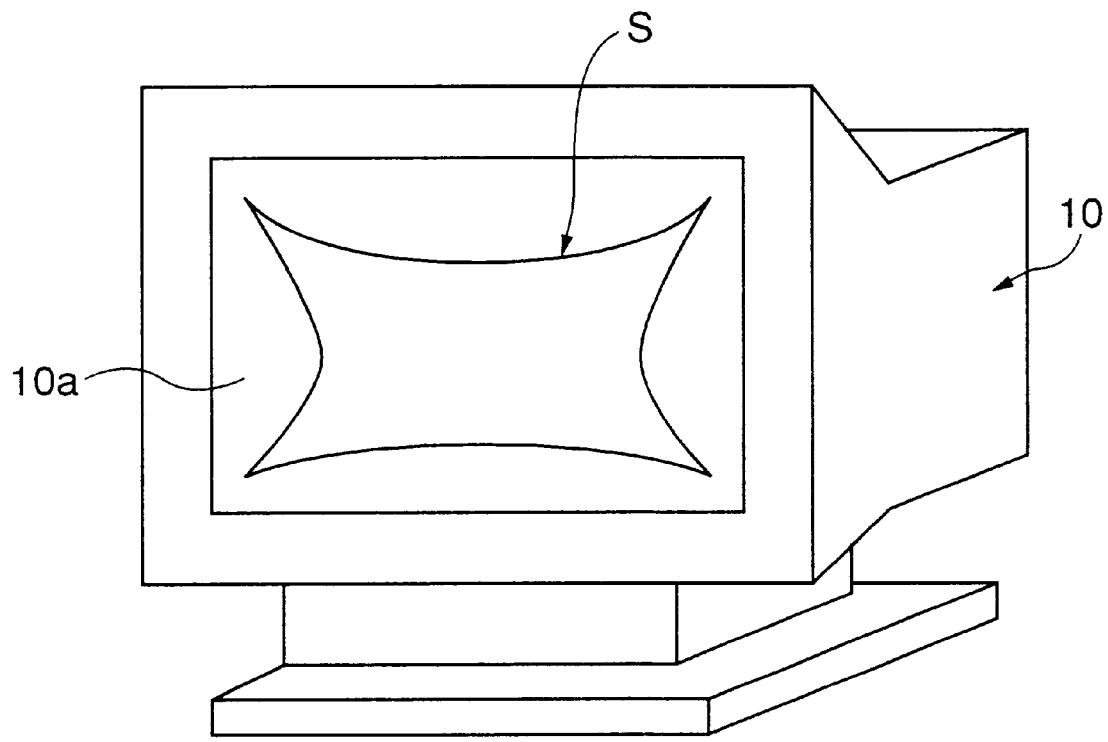
FIG. 1 is a diagram illustrating distortion of a rectangle image displayed on a screen of a display device.
Figure 2:
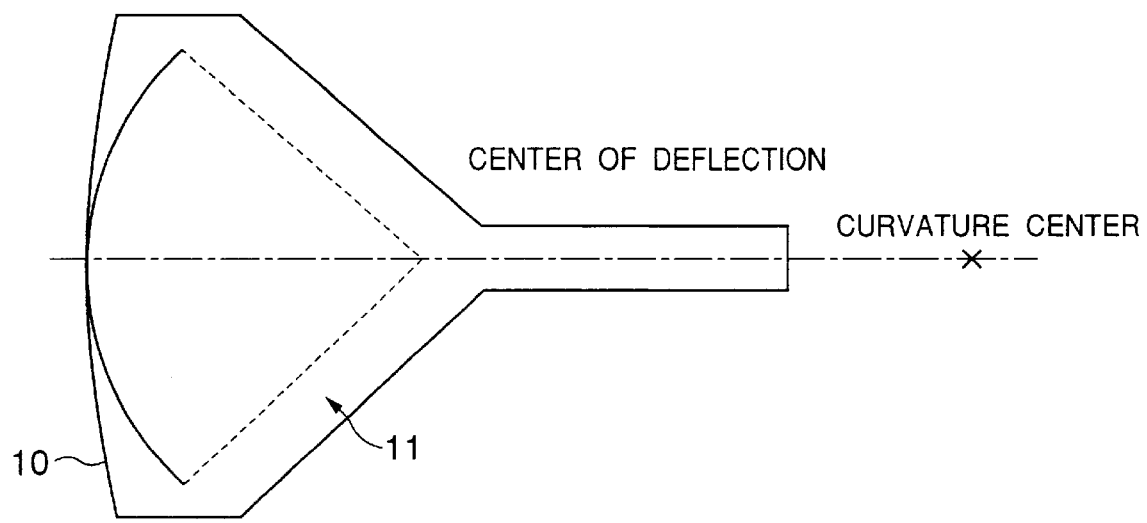
FIG. 2 is a diagram illustrating a relationship between a structure of a CRT and deflection of an electron beam.
Figure 3A:
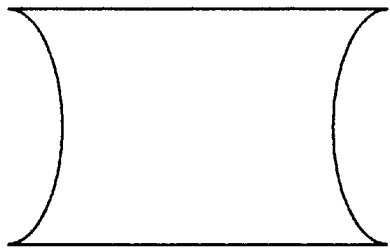
FIGS. 3A, 3B, 3C and 3D are diagrams illustrating examples of distortion in a horizontal direction.
Figure 3B:
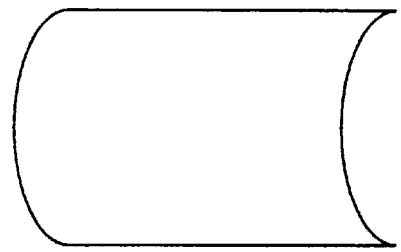
Figure 3C:
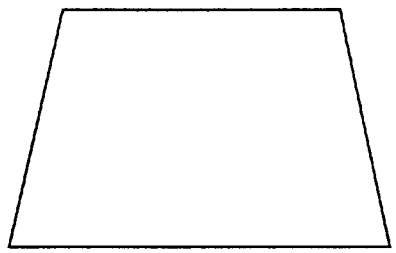
Figure 3D:
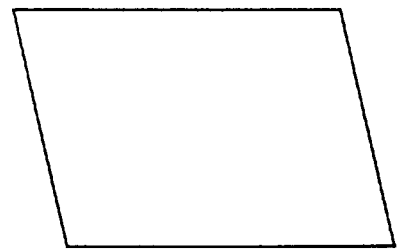
Figure 4:
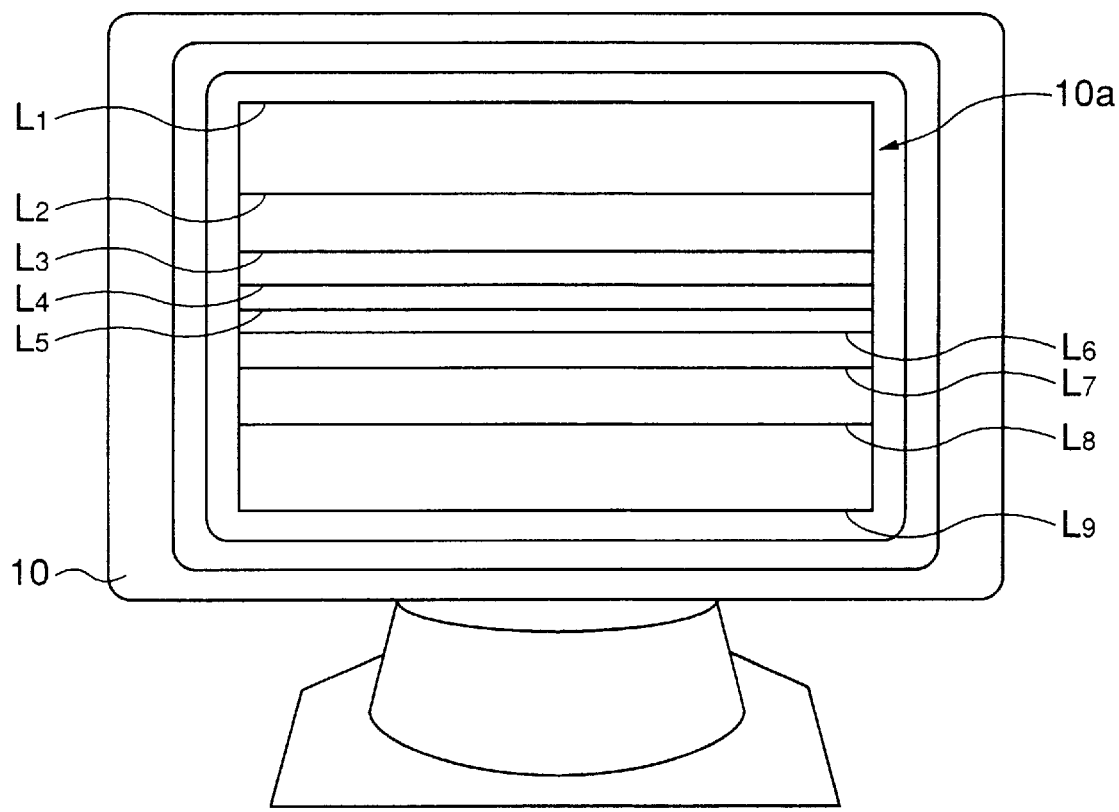
FIG. 4 is a diagram illustrating vertical linearity distortion.
Figure 5:
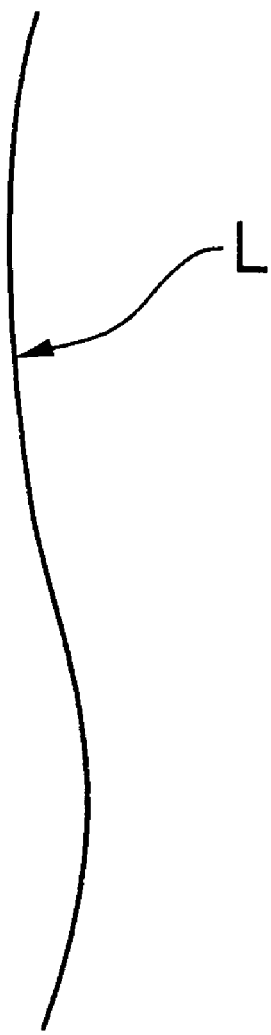
FIG. 5 is a diagram illustrating a distorted line displayed on the screen.

To correct the vertical linearity, as shown in FIG. 4, n lines expanding in the horizontal direction are displayed on the screen so that they should be arranged at constant intervals, and the TV camera takes pictures of the lines. The intervals F(m) of the respective lines (m and m+1) are calculated based on an image obtained by taking pictures of the lines (stored in the memory unit 23).

After the intervals F(m) are obtained, the intervals are accumulated. Based on the accumulating result, a vertical scanning position G(x) corresponding to a position of each line is defined as follows.

$$G(x) = \sum_{m=o}^{n} F(m) - \sum_{m=o}^{x} F(m) \quad (x: 0 - n) \quad (14)$$

In the above equation, x is a position in the vertical direction and a parameter corresponding to time.

In addition, a sawtooth wave component H(x) of the vertical scanning position is represented as follows.

$$H(x) = \{G(n) - G(O)\} \cdot x/n + G(O) \quad (15)$$

Figure 22:
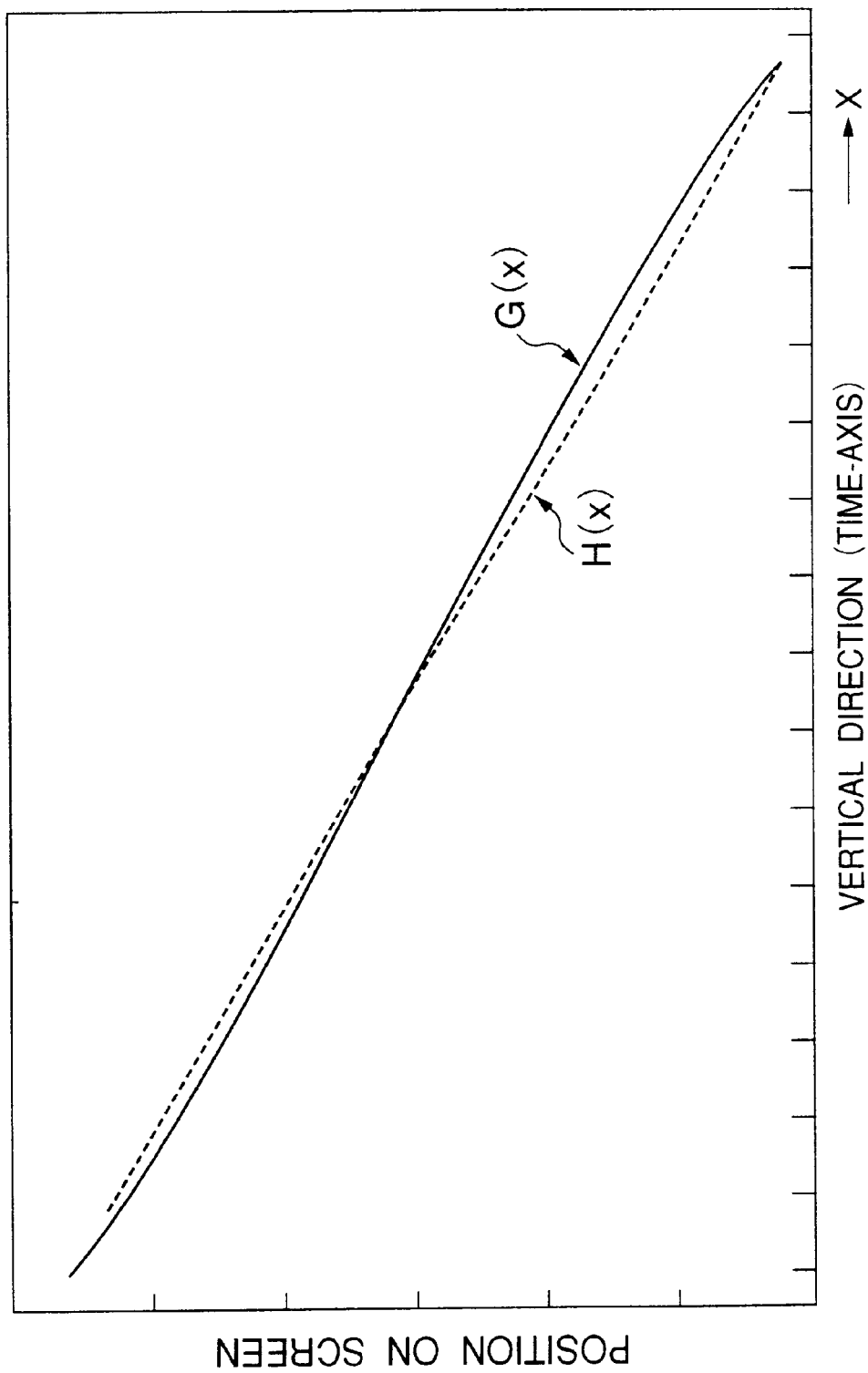
FIG. 22 is a diagram illustrating a function representing scanning positions in a perpendicular direction used to represent the vertical linearity of the display device and a function representing a sawtooth waveform component.

The sawtooth wave component H(x) corresponds to a position of a line, at a time x in the vertical direction, out of the lines arranged at intervals of $\{G(n)-G(O)\}/n$. The vertical scanning position G(x) and the sawtooth wave component H(x) are graphed as shown in FIG. 22.

A function D corresponding to the difference between the vertical scanning position G(x) and the sawtooth wave component H(x) is defined as the distortion data (information representing the deterioration of the vertical linearity) as follows.

$$D = [G(x) - H(x)] * \kappa \quad (16)$$

Figure 23:
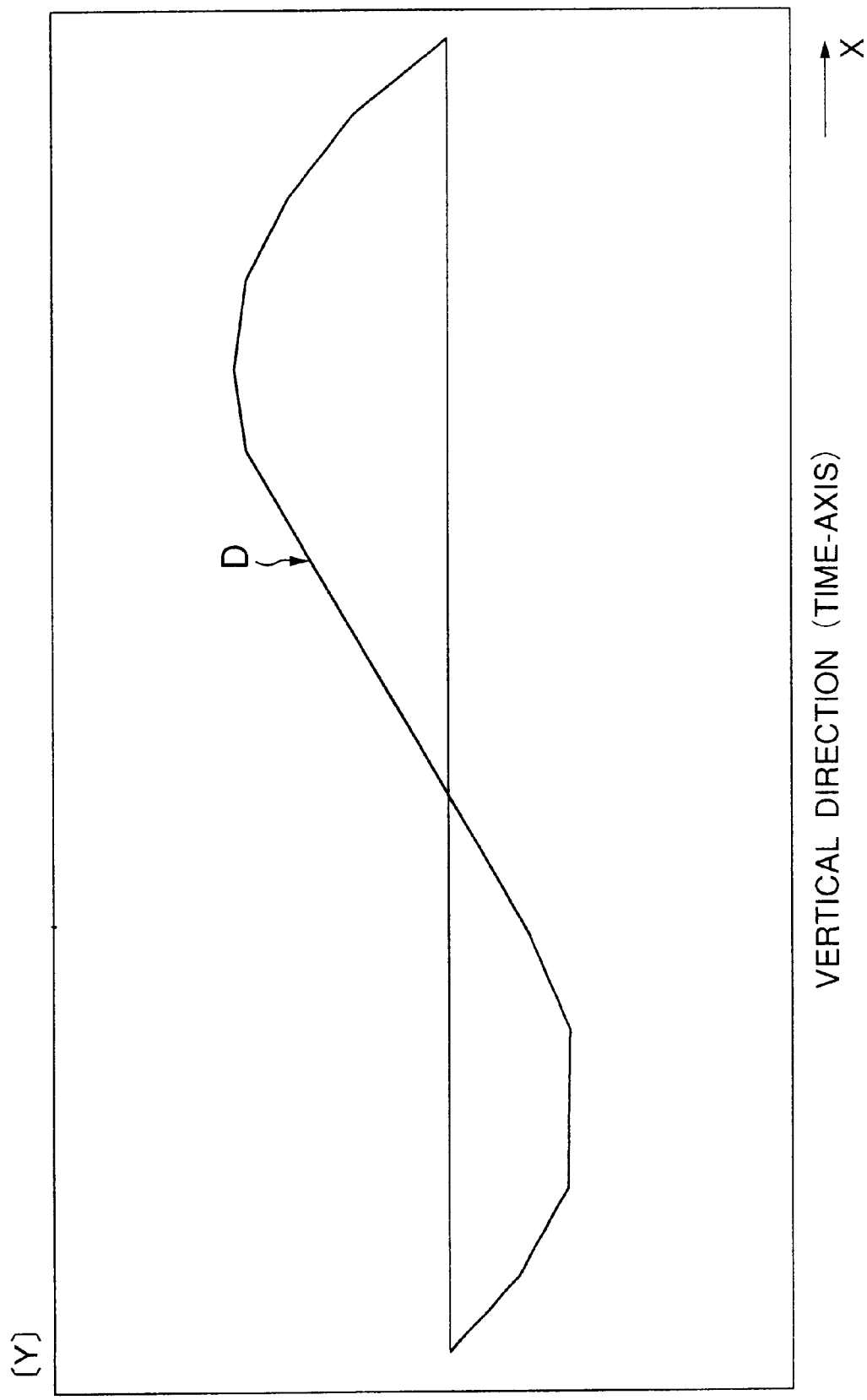
FIG. 23 is a diagram illustrating a function representing the vertical linearity distortion.

In the above equation (16), κ is a correction coefficient. The distortion data D as defined above is graphed as shown in FIG. 23.

The x-coordinate axis is divided into eight intervals and the distortion data D in each of the intervals are approximated by a quadratic function (the spline function: the basic waveform). This approximation is carried out in accordance with the method of least squares under a condition where the quadratic functions are smoothly connected at borders between the intervals. As a result, coefficients of the quadratic functions representing the distortion in the respective intervals are decided.

Figure 24:
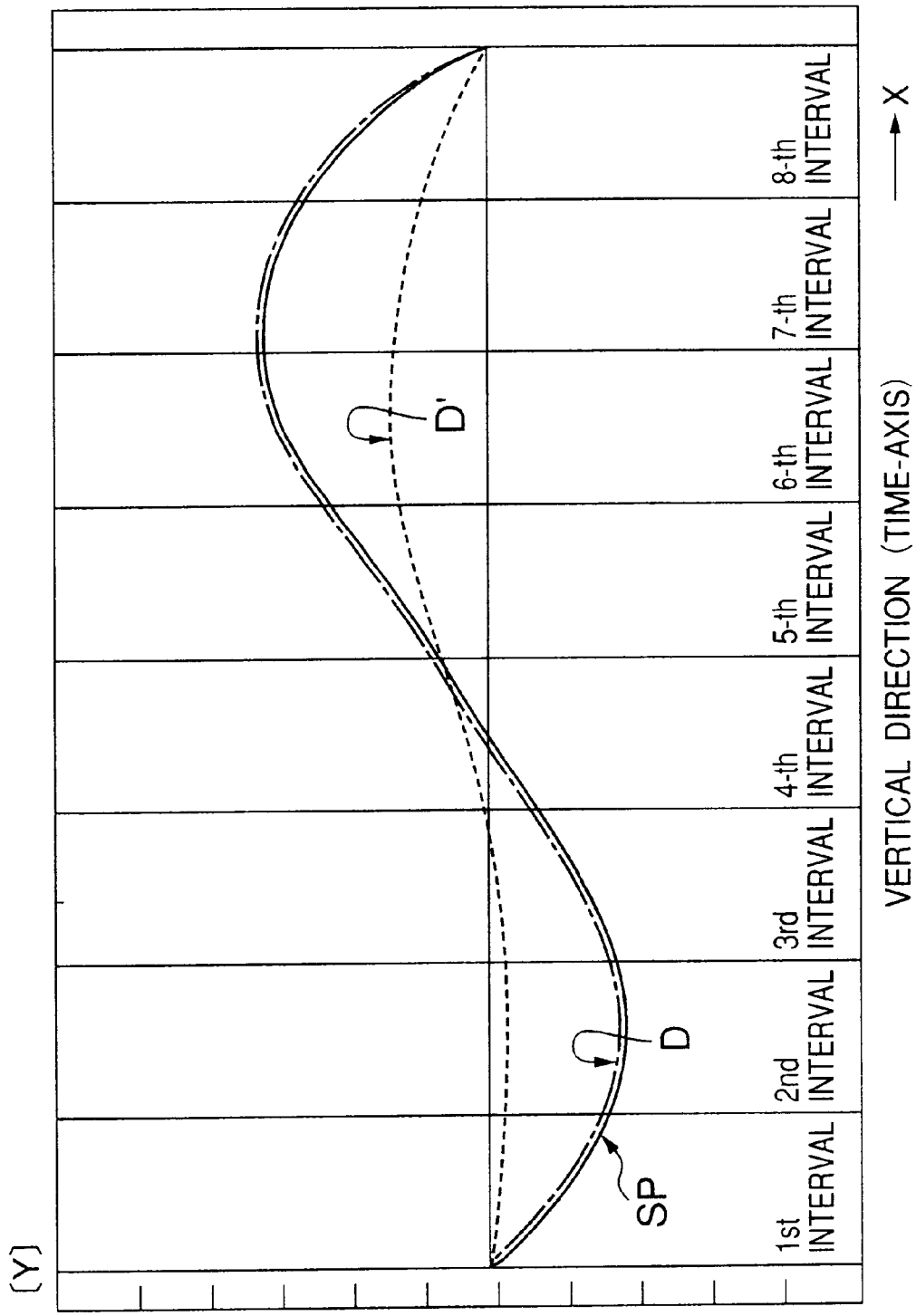
FIG. 24 is a diagram illustrating a function representing the vertical linearity distortion, the spline function approximately representing the function and a function representing the vertical linearity which has been corrected.

In a case of the distortion data D (a chain line) as shown in FIG. 24, coefficients A, B and C of the following quadratic function of x which varies from 0 to 1 in the respective intervals are obtained as indicated in TABLE-3.

$$Y = (A-512)x^2 + (B-512)x + C \quad (17)$$

TABLE 3

|  | A | B | C |
|---|---|---|---|
| 1st interval | 607 | 247 | 512 |
| 2nd interval | 587 | 436 | 342 |
| 3rd interval | 550 | 587 | 342 |
| 4-th interval | 502 | 663 | 454 |
| 5-th interval | 533 | 643 | 595 |
| 6-th interval | 426 | 685 | 747 |
| 7-th interval | 440 | 513 | 834 |
| 8-th interval | 403 | 370 | 764 |

A spline curve SP which is represented by superposition of the quadratic functions identified by the above coefficients in the respective intervals is formed as shown in FIG. 24 (a thin line). That is, the distortion D is approximated by the spline curve SP.

The values of the respective coefficients A, B and C (see TABLE-3) are stored in the data storage unit 24 as the distortion characteristic data (the distortion characteristic vector) representing the deterioration (the distortion) of the vertical linearity of the respective lines displayed on the screen.

The distortion characteristic data which is extracted from a display device and stored in the data storage unit 24 is supplied to the data writing unit (see FIG. 10). The distortion characteristic data is then written, as the correcting data, in the memory of the display device by the data writing unit 25.

Figure 25:
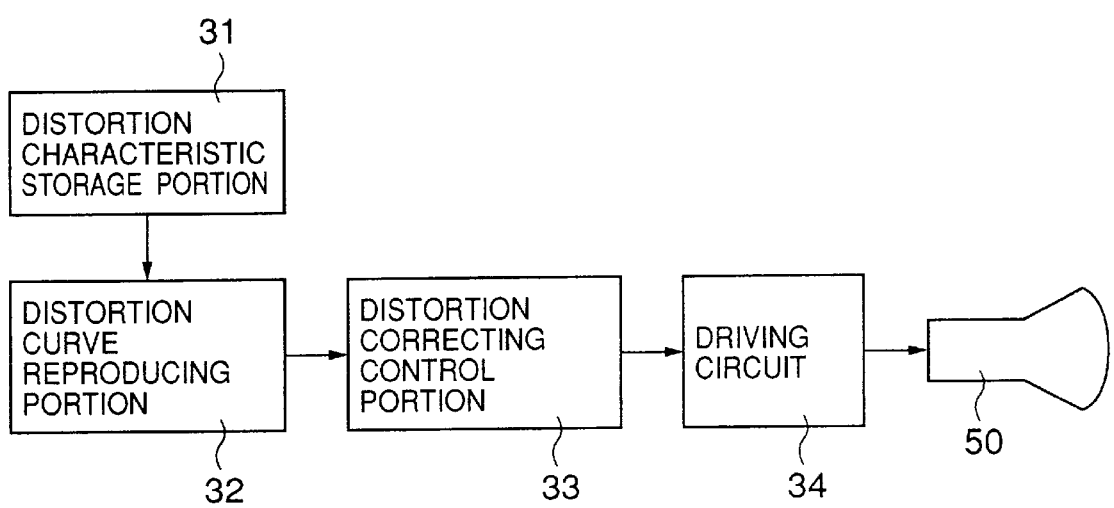
FIG. 25 is a block diagram illustrating another example of a functional structure of the display device.

A functional structure of the display device is shown, for example, in FIG. 25.

Referring to FIG. 25, the display device 10 has a distortion characteristic storage portion 31, a distortion curve reproducing portion 32, a distortion correcting control portion 33, a driving circuit 34 and a CRT 50. The distortion characteristic storage portion 31 is formed of a non-volatile memory such as an EEPROM. The distortion characteristic of the display device 10 which is obtained as described above is stored in the distortion characteristic storage portion 31. The distortion curve reproducing portion 32 has information regarding the basic distortion vectors (the basic waveforms) which are used to obtain the distortion characteristic data. The distortion curve reproducing portion 32 approximately reproduces a distortion curve based on the distortion characteristic data represented using the basic distortion vectors.

In addition, the distortion correcting control portion 33 generates, based on the distortion curve reproduced by the distortion curve reproducing portion 32, a correction control signal for canceling the distortion represented by the distortion curve, The driving circuit 34 carries out the deflection control (the horizontal deflection control and the vertical deflection control) of the CRT 50 based on the correcting control signal.

In a case where K functions are used as the basic distortion vectors to obtain the distortion characteristic, the following processes are performed in the distortion curve reproducing portion 32 and the distortion correcting control portion 33.

Each of K components of the distortion characteristic data and a corresponding one of the K functions are multiplied. The multiplying results are successively added. As a result, a distortion function (corresponding to the distortion vector (the equation (3))) representing the distortion curve is obtained. The variable of the distortion function is varied at predetermined intervals, so that N distortion function values are obtained. The correcting control signal to cancel the distortion represented by the N distortion function values is generated.

In a case where the B spline functions are used as the basic distortion vectors, each of K components of the distortion characteristic data and a corresponding one of the K spline functions are multiplied together. The multiplying results are successively added, so that coefficients of a piecewise polynomial calculated (CALCULATION OF COEFFICIENTS OF PIECEWISE POLYNOMIAL). The variable of the piecewise polynomial identified by the coefficients is varied at predetermined intervals, so that N values are obtained (CALCULATION OF VALUES OF PIECEWISE POLYNOMIAL). The correcting control signal canceling the distortion represented by the N values is generated.

In a case where the power functions are used as the basic distortion vectors, while varying the variable at constant intervals, values of each of the power functions are calculated. Each of the values and corresponding K components of the distortion data are multiplied together. The multiplying results are successively added and the add value is output (CALCULATION OF POLYNOMIAL FUNCTION VALUE). While varying the variable at constant intervals, the above process is repeated N times. The correcting control signal for canceling the distortion represented by the N values is generated.

In a case where the Fourier transform operation is performed with respect to the distortion vector and the Fourier coefficients of lower orders are extracted as the distortion characteristic, the inverse Fourier operation is performed with respect to the distortion characteristic data having K components (the Fourier coefficients). The correcting control signal for canceling the distortion represented by the values obtained by the inverse Fourier transform operation is generated. In this case, information regarding the basic distortion vectors is not needed.

A detailed description will now be given of the constitution of the display device 10.

Figure 26:
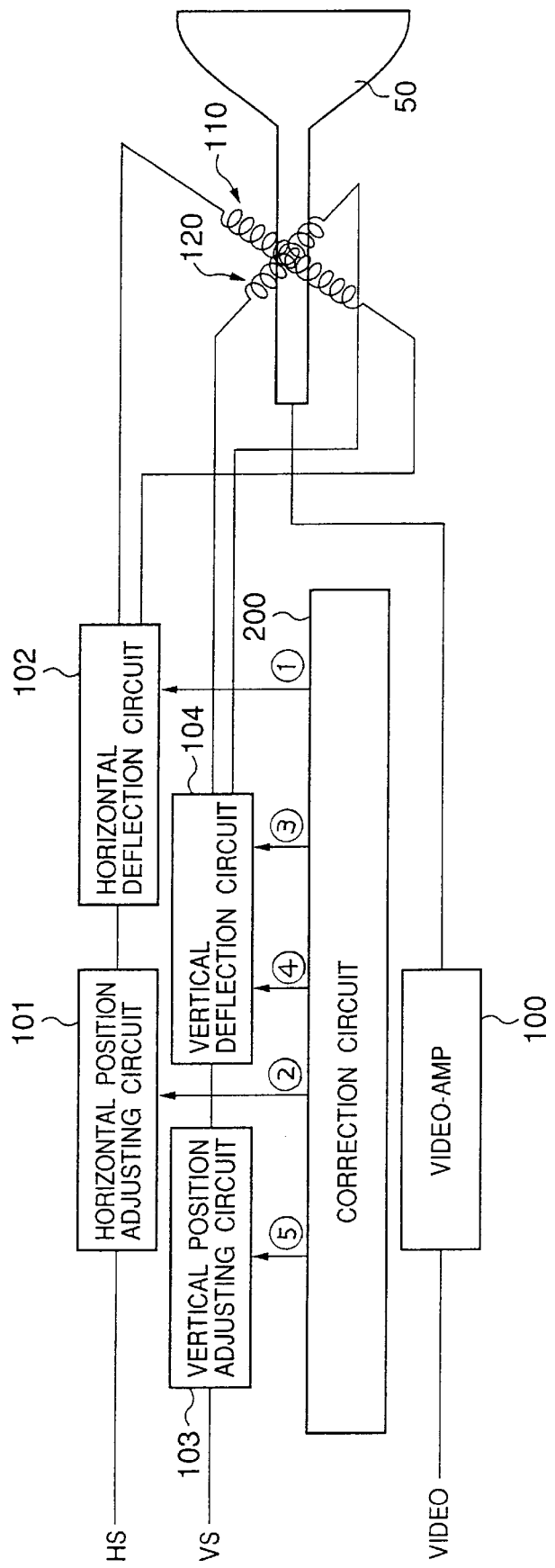
FIG. 26 is a diagram illustrating a structure of the display device.

The display device 10 is formed as shown in FIG. 26. In this embodiment, data representing the symmetrical distortion, the asymmetrical distortion and the distortion of the vertical linearity are used as the distortion characteristic data. These distortions are corrected.

Referring to FIG. 26, a horizontal deflection coil 110 and a vertical deflection coil 120 are provided in the CRT 50. The horizontal deflection coil 110 is used for the deflection control in the horizontal direction and the vertical deflection coil 120 is used for the deflection control in the vertical direction. Video signals (VIDEO) are supplied to an electron gun of the CRT 50 via a video-amplifier 100.

For the horizontal deflection coil 110, a horizontal position adjusting circuit 101 and a horizontal deflecting circuit 102 are provided. Control currents are supplied from the horizontal position adjusting circuit 101 and the horizontal deflecting circuit 102 to the horizontal deflection coil 110. For the vertical deflection coil 120, a vertical position adjusting circuit 103 and a vertical deflecting circuit 104 are provided. Control currents are supplied from the vertical position adjusting circuit 103 and the vertical deflecting circuit 104 to the vertical deflection coil 120. The horizontal position adjusting circuit 101 and the horizontal deflecting circuit 102 are operated in synchronism with a horizontal synchronizing signal HS. The vertical position adjusting circuit 103 and the vertical deflecting circuit 104 are operated in synchronism with a vertical synchronizing signal VS.

A set of the horizontal position adjusting circuit 101, the horizontal deflecting circuit 102, the vertical position adjusting circuit 103 and the vertical deflecting circuit 104 corresponds to the driving circuit 34 shown in FIG. 25.

The display device 10 further has a correction circuit 200. The correction circuit 200 generates correcting control signals. The correcting control signals are used to correct, based on the distortion characteristic data which has been previously extracted, the distortions (the symmetrical distortions and the asymmetrical distortions in the horizontal and vertical directions and the distortion of the vertical linearity) of the CRT 50. Actually, a horizontal size control signal ①, to be supplied to the horizontal deflecting circuit 102, a horizontal position control signal ② to be supplied to the horizontal position adjusting circuit 101, a vertical deflection control signal ③ and a vertical size control signal ④ to be supplied to the vertical deflecting circuit 104 and a vertical position control signal ⑤ to be supplied to the vertical position adjusting circuit 103 are generated by the correction circuit 200.

The correction circuit 200 has functions of the distortion characteristic storage portion 31, the distortion curve reproducing portion 32 and the distortion correcting control portion 33 all of which are shown in FIG. 25. The correction circuit 200 is formed as shown in FIG. 27.

Figure 27:
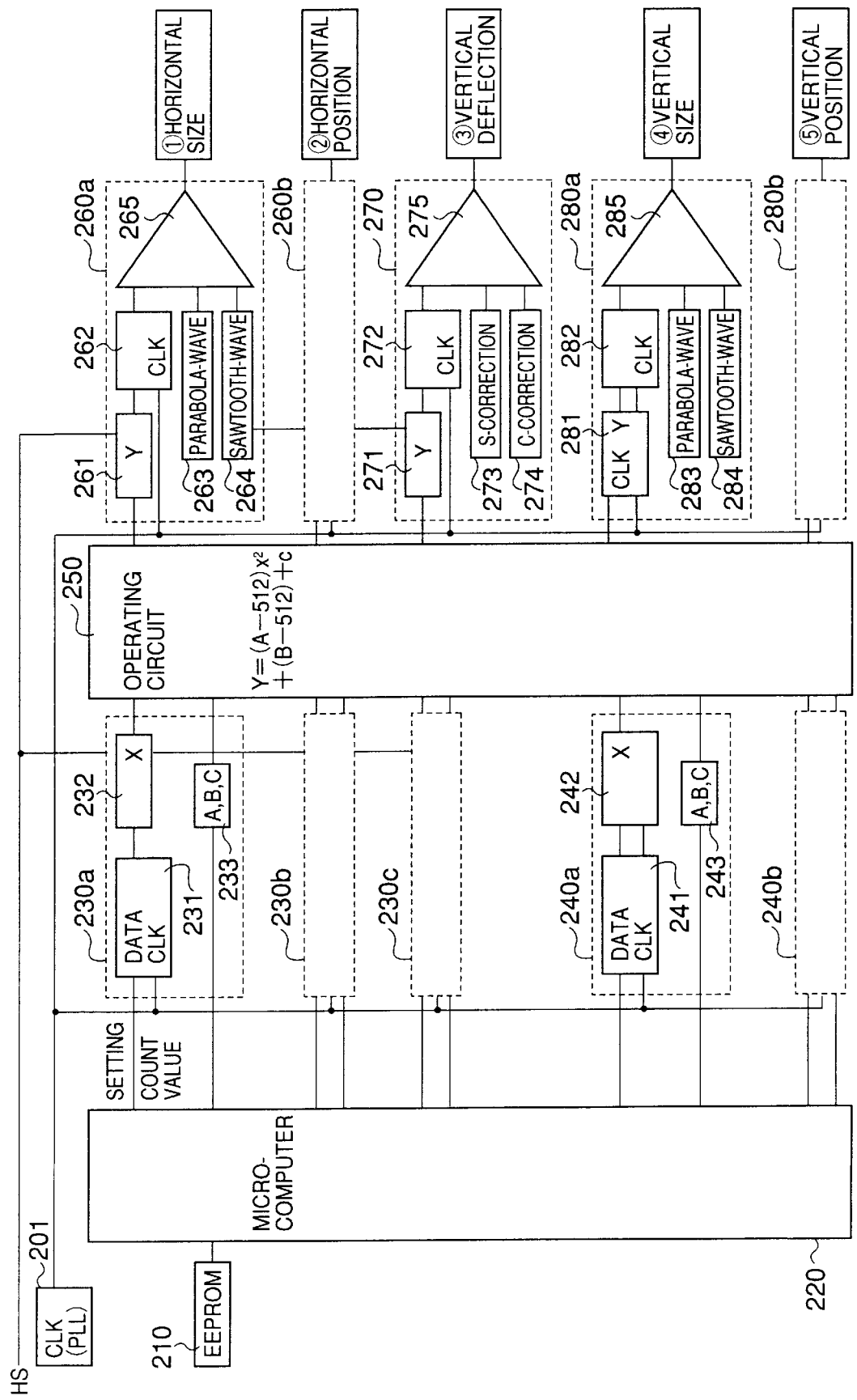
FIG. 27 is a block diagram illustrating a constitution of a correcting circuit of the display device shown in FIG. 26.

Referring to FIG. 27, the correction circuit 200 has an EEPROM 210, a control unit 220, data setting circuits 230a, 230b, 230c, 240a and 240b, an operating circuit 250 and analog output circuits 260a, 260b, 270, 280a and 280b. The EEPROM 210 maintains the distortion characteristic data which was written in the EEPROM 210 in the image adjusting process in the factory of the display device 10. As the distortion characteristic data, the values of the coefficients A, B and C (see TABLE-1) identifying the spline curve $SP_s$, (see FIG. 20) representing the symmetrical distortion $D_s$ in the horizontal direction, the values of the coefficients A, B and C (see TABLE-2) identifying the spline curve $SP_u$ (see FIG. 21) representing the asymmetrical distortion $D_u$ in the horizontal direction, the values of the coefficients of the spline curves representing the symmetrical distortion and the asymmetrical distortion in the vertical direction in the same manner as in the case of the horizontal direction, and the values of the coefficients A, B and C (see TABLE-3) identifying the spline curve SP (see FIG. 24) representing the distortion D of the vertical linearity are used.

The control unit 220 is formed of a general microcomputer system. The respective values of the coefficients which are the distortion characteristic data in the respective direction are read out of the EEPROM 210. The values of the coefficients are output in accordance with a predetermined timing. In addition, the control unit 220 outputs an initial value (e.g., "0") to be set in a counter at a time corresponding to the leading position of each of the intervals shown in each of FIGS. 20, 21 and 24.

Data required to correct the symmetrical distortion in the horizontal direction is set in the data setting circuit 230a. Data required to correct the asymmetrical distortion in the horizontal direction is set in the data setting circuit 230b. Data required to correct the distortion of the vertical linearity is set in the data setting circuit 230c. In addition, data required to correct the symmetrical distortion in the vertical direction is set in the data setting circuit 240a. Data required to correct the asymmetrical distortion in the vertical direction is set in the data setting circuit 240b. The correction circuit 200 has a clock generating circuit 201 which generates a clock signal CLK based on the horizontal synchronizing signal HS. The clock signal from the clock generating circuit 201 is supplied to the respective data setting circuits 230a, 230b, 230c, 240a and 240b.

The data setting circuits 230a, 230b and 230c have the same constitution. Each of the data setting circuits 230a, 230b and 230c has a counter 231, a latch circuit 232 and a register 233. When the initial value supplied from the control unit 220 is set, the counter 231 starts a count-up operation in synchronism with the clock signal CLK. The count value of the counter 231 represents a value (from 0 to 1) of the variable x of the quadratic function (the spline function: see the equations (12), (13) and (17)).

The latch circuit 232 latches the count value of the counter 231 in synchronism with the horizontal synchronizing signal HS. The register 233 maintains the values of the coefficients A, B and C (the distortion characteristic data), representing the distortion, supplied from the control unit 220. The values of the coefficients A, B and C (see TABLE-1) representing the symmetrical distortion in the horizontal direction are set in the register 233 of the data setting circuit 230a. The values of the coefficients A, B and C (see TABLE-2) representing the asymmetrical distortion in the horizontal direction are set in the register 233 of the data setting circuit 230b. The values of the coefficients A, B and C (see TABLE-3) representing the distortion of the vertical linearity are set in the register 233 of the data setting circuit 230c. The values of the respective coefficients are updated at a time corresponding to the leading position of each of the respective intervals (see FIGS. 20, 21 and 24).

The data setting circuit 240a has the same constitution as the data setting circuit 240b. Each of the data setting circuits 240a and 240b has a counter 241, a latch circuit 242 and a register 243. When the initial value supplied from the control unit 220 is set, the counter 241 starts a count-up operation in synchronism with the clock signal CLK. The count value of the counter 241 represents a value (from 0 to 1) of the variable x of the quadratic function (the spline function) in the same manner as that of the counter 231.

The latch circuit 242 latches the count value of the counter in synchronism with the clock signal CLK instead of the horizontal synchronizing signal HS used in the latch circuit 232. The register 243 maintains the values of the coefficients A, B and C (the distortion characteristic data), representing the distortion, supplied from the control unit 220. The values of the coefficients A, B and C representing the symmetrical distortion in the vertical direction are set in the register 243 of the data setting circuit 240a. The values of the coefficients A, B and C representing the asymmetrical distortion in the vertical direction are set in the register 243 of the data setting circuit 240b.

The operating circuit 250 calculates the distortion data Y in accordance with the following equation (18), using the values of the coefficients A, B and C set in the registers 233 and 243 of the respective data setting circuits 230a, 230b, 230c, 240a and 240b and the values of the variable x set in the latch circuits 231.

$$Y=(A-512)x^2+(B-512)x+C \qquad (18)$$

The operating circuit 250 has a multiplier, an adder, a selector circuit and other elements. The above calculation (in accordance with the equation (18)) is carried out, using the values of the coefficients A, B and C and the variable x all of which are selected by the selector circuit, under the time-sharing control.

The analog output circuits 260a and 260b have the same constitution. Each of the analog output circuits 260a and 260b has a latch circuit 261, a digital-analog converter 262, a parabola-wave output circuit 263, a sawtooth-wave output circuit 264 and an adding circuit 265. The latch circuit 261 latches a value of the distortion data Y calculated by the operating circuit 250 in synchronism with the horizontal synchronizing signal. The value of the distortion data Y representing the symmetrical distortion in the horizontal direction is set in the latch circuit 261 of the analog output circuit 260a. The value of the distortion data Y representing the asymmetrical distortion in the horizontal direction is set in the latch circuit 261 of the analog output circuit 260b. To avoid varying the data on the screen, data in the respective latch circuits 261 is varied in return of the horizontal synchronizing signal and the vertical synchronizing signal.

The digital-analog converter 262 converts the distortion data Y latched in the latch circuit 261 into an analog signal (a control signal) in synchronism with the clock signal CLK. The analog signal (the control signal) output from the digital-analog converter 262 has a level which causes the horizontal deflection coil 110 to cancel the distortion (see FIGS. 20 and 21) corresponding to the value of the distortion data.

The parabola-wave output circuit 263 and the sawtooth output circuit 264 output control signals to correct the distortion (see FIGS. 17A, 17B, 17C and 17D) in the horizontal direction in the same manner as in the conventional case. The level of each of the control signals is, in principle, the same as the level in a case where the test pattern (e.g., the rectangular pattern) is displayed on the screen (see FIG. 10) to take a picture of the test pattern (the initial adjusting state).

The adding circuit 265 superposes the analog signal (the correcting control signal) from the digital-analog converter 262 and the respective correcting control signals from the parabola-wave output circuit 263 and the sawtooth-wave output circuit 264 on the original control signal (not shown) in the horizontal direction. The output signal from the adding circuit 265 of the analog output circuit 260a is supplied, as the horizontal size control signal ①, to the horizontal deflection circuit 102 (see FIG. 26). The output signal from the adding circuit 265 of the analog output circuit 260b is supplied, as the horizontal position control signal ②, to the horizontal position adjusting circuit 101.

The analog output circuit 270 has a latch circuit 271, a digital-analog converter 272, an S-correcting circuit 273, a C-correcting circuit 274 and an adding circuit 275. The latch circuit 271 and the digital-analog converter 272 have the same constitution as those of the analog output circuits 260a and 260b as described above. That is, the latch circuit 271 latches in synchronism with the horizontal synchronizing signal HS the value of the distortion data Y, representing the distortion of the vertical linearity, output from the operating circuit 250. The digital-analog converter 272 then converts the value of the distortion data Y set in the latch circuit 271 into an analog signal (a control signal). In this case, the analog signal has the level which causes the vertical deflection coil 120 to cancel the distortion (see FIG. 24) corresponding to the value of the distortion data Y.

The S-correcting circuit 273 and the C-correcting circuit 274 output control signals to correct the distortion of the vertical linearity (see FIG. 24) in the same manner as in the conventional case. The level of each of the control signals is, in principle, the same as the level in a case where the test pattern (e.g., the rectangular pattern) is displayed on the screen (see FIG. 10) to take a picture of the test pattern (the initial adjusting state).

The adding circuit 275 superposes the analog signal (the correcting control signal) from the digital-analog converter 272 and the respective correcting control signals from the S-correcting circuit 273 and the C-correcting circuit 274 on the original control signal (not shown) in the vertical direction. The output signal from the adding circuit 275 is supplied, as the vertical deflection control signal ③, to the vertical deflection circuit 104 (see FIG. 26).

The analog output circuits 280a and 280bhave the same constitution. Each of the analog output circuits 280a and 280b has a latch circuit 281, a digital-analog converter 282, a parabola-wave output circuit 283, a sawtooth-wave output circuit 284 and an adding circuit 285. The latch circuit 281 latches the value of the distortion data Y from the operating circuit 250 in synchronism with the clock signal CLK instead of the horizontal synchronizing signal HS used in the respective latch circuits 261 and 271. The value of the distortion data Y representing the symmetrical distortion in the vertical direction is set in the latch circuit 281 of the analog output circuit 280a. The value of the distortion data Y representing the asymmetrical distortion in the vertical direction is set in the latch circuit 281 of the analog output circuit 280b.

The digital-analog converter 282, the parabola-wave output circuit 282, the sawtooth output circuit 284 and the adding circuit 285 have the same constitutions as those of the analog output circuits 260*a* and 260*b*. The output signal of the adding circuit 285 of the analog output circuit 280*a* is supplied to the vertical deflection circuit 104 as the vertical size control signal ④. The output signal of the adding circuit 285 of the analog output circuit 280*b* is supplied to the vertical position adjusting circuit 103 as the vertical position control signal ⑤.

In the example of the display device 10 as described above, the image distortion obtained from the test pattern displayed on the screen of the display device 10 in the factory (in the image adjusting process) is approximated by the spline functions. The values of the coefficients A, B and C identifying the spline functions are stored in the EEPROM 210 of the display device 10. When an image is actually displayed on the screen of the CRT 50, values of the spline functions corresponding to the distortion are reproduced from the values of the coefficients A, B and C stored in the EEPROM 210. The correcting control signals, generated in the basis of the values of the spline functions, for canceling the distortion of the image are then superposed on the control signals for the horizontal deflection and the vertical deflection. As a result, the image from which the distortion (see FIGS. 17A, 17B, 17C, 17D and 4) is eliminated is displayed on the screen.

The correcting circuit 200 described above may be formed as shown in FIG. 28.

Figure 28:
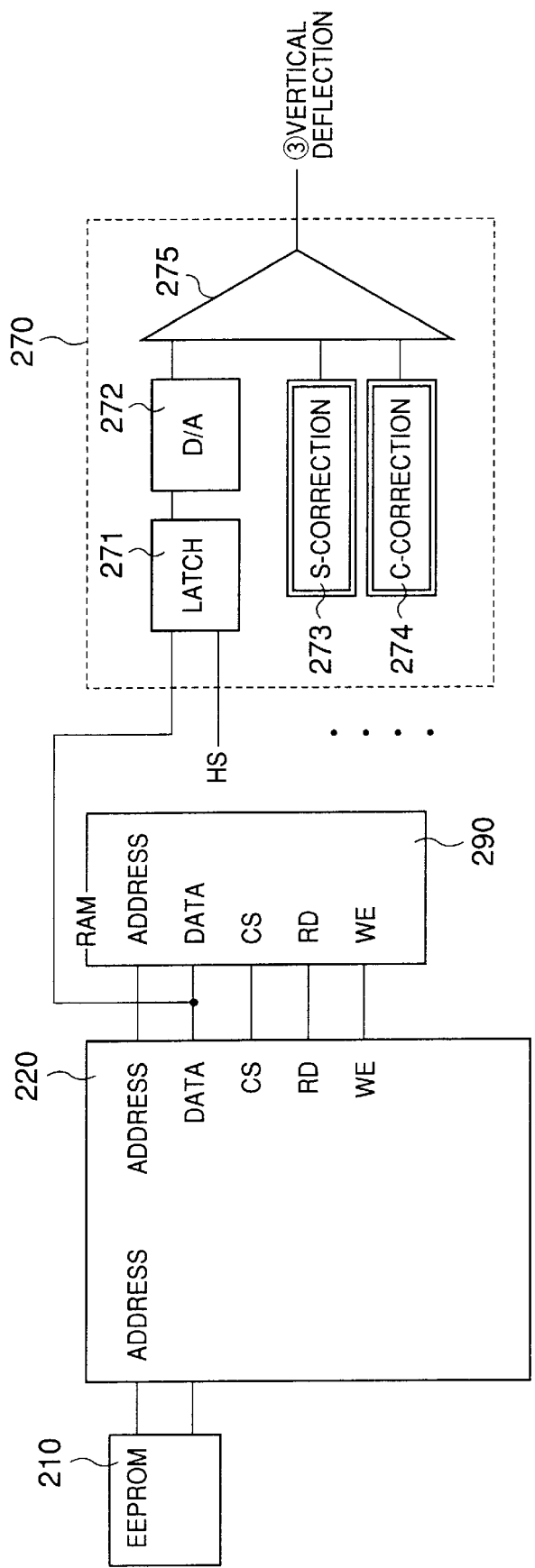
FIG. 28 is diagram illustrating another example of the correcting circuit.

In this example, a control unit 220' (a microcomputer system) calculates the distortion data Y using the respective coefficients of the spline functions, representing the distortion, stored in the EEPROM 210. The distortion data Y is stored in a RAM (memory) 290. The distortion data Y is read out of the RAM 290 line by line and supplied to a corresponding analog output circuit. FIG. 28 shows only the analog output circuit 270 for generating the vertical deflection control signal ③. However, in fact, the analog output circuits 260*a*, 260*b*, 280*a* and 280*b* for generating the horizontal size control signal ①, the horizontal position control signal ②, the vertical size control signal ④ and the vertical position control signal ⑤ are connected to the RAM 290. Corresponding distortion data Y is supplied from the RAM 290 to each of the analog output circuits 260*a*, 260*b*, 280*a* and 280*b*.

In a case where the RAM 290 is used as described above, the correcting circuit 200 can be simplified.

The present invention is not limited to the aforementioned embodiments, and other variations and modifications may be made without departing from the scope of the claimed invention.

What is claimed is:

1. A method for correcting distortion of an image displayed on a screen of a display device, said method comprising the steps of:
    (a) taking a picture of a test pattern displayed on the screen of said display device in an adjusting state;
    (b) extracting distortion information representing distortion of the test pattern from an image obtained from a result of the step (a);
    (c) extracting additional information as a distortion characteristic, the distortion information extracted in step (b) being approximately represented by a plurality of basic vectors which are known and the additional information coupled to the basic vectors, wherein eigenvectors are used as the basic vectors;
    (d) storing the additional information in a storage unit;
    (e) reproducing the distortion information using the additional information stored in said storage unit and said plurality of basic vectors when an image is displayed on the screen of said display device; and
    (f) controlling said display device based on the distortion information reproduced in step (e) so that the distortion is canceled.

2. The method as claimed in claim 1, wherein the eigenvectors are obtained by processing distortion information items extracted from test patterns displayed on screens of a plurality of display devices in accordance with a principle component analyzing method.

3. The method as claimed in claim 1, wherein a predetermined function system is used as the eigenvectors, weights with which functions of said predetermined function system are linearly superposed are extracted as the additional information which should be extracted as the distortion characteristic, the functions linearly superposed with the weights approximately representing the distortion information.

4. The method as claimed in claim 3, wherein B spline functions are used as the functions of said predetermined function system, values of coefficients of the B spline functions being obtained when the B spline functions are linearly superposed so that the distortion information is approximately represented by a spline curve being extracted as the distortion characteristic.

5. The method as claimed in claim 1, wherein coefficients of Fourier series are extracted as the additional information which should be extracted as the distortion characteristic, the distortion information being approximately represented by the Fourier series.

6. The method as claimed in claim 1, wherein information corresponding to a difference between and a sum of formulas representing right and left lines of a rectangular test pattern and information corresponding to a difference between and a sum of formulas representing upper and lower lines of the rectangular test pattern are extracted as the distortion information.

7. The method as claimed in claim 1, wherein a plurality of lines expanding in a horizontal direction which are displayed on the screen so that they should be arranged at constant intervals are used as the test pattern, information corresponding to a difference between a first formula and a second formula is extracted as the distortion information, the first formula representing positions, in a vertical direction, obtained based on intervals of the lines of the test patterns which are actually observed, the second formula representing positions, in the vertical position, obtained based on the constant intervals at which the lines of the test pattern should be arranged.

8. A distortion detecting unit for detecting distortion of an image displayed on a screen of a display device, said distortion detecting unit comprising:
    picture means for taking a picture of a predetermined test pattern displayed on the screen of said display device which is controlled under a predetermined state;
    distortion information extracting means for extracting distortion information representing distortion of the test pattern from an image corresponding to a result obtained by said picture means; and
    distortion characteristic extracting means for extracting additional information as a distortion characteristic, the distortion information extracted by said distortion information extracting means being approximately represented by a plurality of basic vectors which are known and the additional information coupled to the basic vectors, wherein eigenvectors are used as the basic vectors and wherein the additional information which is the distortion characteristic is output as a detected result.

9. The distortion detecting unit as claimed in claim 8 further comprising means for processing distortion information items extracted from test patterns displayed on screen of a plurality of display devices in accordance with a principle component analyzing method so that the eigenvectors are obtained.

10. The distortion detecting unit as claimed in claim 8, wherein said distortion characteristic extracting means uses a predetermined function system as the eigenvectors and extracts weights with which functions of said predetermined function system are linearly superposed as the additional information which should be extracted as the distortion characteristic, the function linearly superposed with the weights approximately representing the distortion information.

11. The distortion detecting unit as claimed in claim 10, wherein said distortion characteristic extracting means uses B spline functions as the functions of said predetermined function system and extracts values of coefficients of the B spline functions obtained when the B spline functions are linearly superposed so that the distortion information is approximately represented by a spline curve as the distortion characteristic.

12. The distortion detecting unit as claimed in claim 8, wherein said distortion characteristic extracting means extracts coefficients of Fourier series as the additional information which should be extracted as the distortion characteristic, the distortion information being approximately represented by the Fourier series.

13. The distortion detecting unit as claimed in claim 8, wherein said distortion information extracting means extracts information corresponding to a difference between and a sum of formulas representing right and left lines of a rectangular test pattern and information corresponding to a difference between and a sum of formulas representing upper and lower lines of the rectangular test pattern as the distortion information.

14. The distortion detecting unit as claimed in claim 8, wherein a plurality of lines expanding in a horizontal direction which are displayed on the screen so that they should be arranged at constant intervals are used as the test pattern, and wherein said distortion information extracting means extracts information corresponding to a difference between a first formula and a second formula as the distortion information, the first formula representing positions, in a vertical direction, obtained based on intervals of the lines of the test patterns which are actually observed, the second formula representing positions, in the vertical position, obtained based on the constant intervals at which the lines of the test pattern should be arranged.

15. A distortion correcting unit for correcting distortion of an image displayed on a screen of a display device, said distortion correcting unit comprising:

storage means for storing additional information as a distortion characteristic, the additional information being obtained by;
image means for taking a picture of a test pattern displayed on the screen of said display device under an adjusting state;
first extraction means for extracting distortion information representing distortion of the test pattern from an image obtained from a result of the above step; and
second extraction means for extracting the additional information, the distortion information extracted in the above step being approximately represented by a plurality of basic vectors which are known and the additional information coupled to the basic vectors, wherein eigenvectors are used as the basic vectors;

distortion information reproducing means for approximately reproducing the distortion information using the additional information stored in said storage means and said plurality of basic vectors when an image is displayed on the screen of said display device; and control means for controlling said display device based on the distortion information reproduced by said distortion information reproducing means so that the distortion is canceled.

16. The distortion correcting unit as claimed in claim 15, wherein a predetermined function system is used as the eigenvectors, weights obtained when the distortion information is approximately represented by linearly superposing functions of said predetermined function system with the weights being stored as the distortion characteristic in said storage means, and wherein said distortion information reproducing means comprises operating means for linearly superposing the fictions of the predetermined function system with the weights stored as the distortion characteristic in said storage means, a result obtained by said operating means being the distortion information approximately reproduced.

17. The distortion correcting unit as claimed in claim 16, wherein B spline functions are used as the functions of said predetermined function system, coefficients of the B spline functions which are obtained when the B spline functions are linearly superposed so that the distortion information is approximately represented by a spline curve being stored as the distortion characteristic in said storage means, and wherein said operating means has means for calculating values of points on the spline curve which is approximately represented using the coefficients stored as the distortion characteristic in said storage means and the respective B spline functions.

18. The distortion correcting unit as claimed in claim 16, wherein coefficients which are the additional information for a Fourier series obtained by approximately representing the distortion information using the Fourier series are stored as the distortion characteristic in said storage means, and wherein said distortion information reproducing means has operating means for performing an inverse Fourier transform operation using the coefficients stored as the distortion characteristic in said storage means, a result obtained by said operating means being the distortion information approximately reproduced.

19. A display device having a display tube displaying an image by electron beams scanning a surface of said display tube and a deflection unit causing the electron beams to scan the surface of said display tube based on a control signal, said display device comprising:

storage means for storing additional information as a distortion characteristic, the additional information being obtained by:
image means for taking a picture of a test pattern displayed on the screen of said display device under a condition in which said deflection unit is controlled in a predetermined control state;
first extraction means for extracting distortion information representing distortion of the test pattern from an image obtained from a result of the above step; and
second extraction means for extracting the additional information, the distortion information extracted in the above step being approximately represented by a plurality of basic vectors which are known and the additional information coupled to the basic vectors, wherein eigenvectors are used as the basic vectors;

distortion information reproducing means for approximately reproducing the distortion information using the additional information stored in said storage means and said plurality of basic vectors when an image is displayed on the surface of said display tube; and correcting control means for supplying a correcting signal based on the distortion information reproduced by said distortion information reproducing means to said deflection unit so that the distortion is canceled.

20. The display device as claimed in claim 19, wherein a predetermined function system is used as the eigenvectors, weights obtained when the distortion information is approximately represented by linearly superposing functions of said predetermined function system with the weights being stored as the distortion characteristic in said storage means, and wherein said distortion information reproducing means comprises operating means for linearly superposing the functions of the predetermined function system with the weights stored as the distortion characteristic in said storage means, a result obtained by said operating means being supplied as approximately reproduced distortion information to said correcting control means.

21. The display device as claimed in claim 20, wherein B spline functions are used as the functions of said predetermined function system, coefficients of the B spline functions which are obtained when the B spline functions are linearly superposed so that the distortion information is approximately represented by a spline curve being stored as the distortion characteristic in said storage means, and wherein said operating means has means for calculating values of points on the spline curve which is approximately represented using the coefficients stored as the distortion characteristic in said storage means and the respective B spline functions.

22. The display device as claimed in claim 19, wherein coefficients which are the additional information for a Fourier series obtained by approximately representing the distortion information using the Fourier series are stored as the distortion characteristic in said storage means, and wherein said distortion information reproducing means has operating means for performing an inverse Fourier transform operation using the coefficients stored as the distortion characteristic in said storage means, a result obtained by said operating means being supplied as approximately reproduced distortion information to said correcting control means.

23. A method for correcting distortion of an image on a display device, comprising:

representing distortion information extracted from an image obtained from a picture taken of a test pattern displayed on the display device in an adjusting state as a plurality of waveforms, with the distortion information being approximately represented by a plurality of basic vectors, wherein eigenvectors are used as the basic vectors, the eigenvectors being obtained by processing distortion information items extracted from test patterns displayed on screens of a plurality of display devices in accordance with a principle component analyzing method; and canceling a distortion from an image displayed on the display device based on distortion information reproduced using the plurality of waveforms when the image is displayed on the display device.

24. A distortion detecting unit detecting distortion of an image displayed on a display device, comprising:

a picture unit taking a picture of a predetermined test pattern displayed on the display device;

a distortion information extracting unit, coupled to the picture unit, extracting distortion information representing distortion of the test pattern from the picture taken by the picture taking unit; and a distortion characteristic extracting unit, coupled to the distortion information extracting unit, extracting additional information as a distortion characteristic in the form of a plurality of basic vectors, wherein eigenvectors are used as the basic vectors, the eigenvectors being obtained by processing distortion information items extracted from test patterns displayed on screens of a plurality of display devices in accordance with a principle component analyzing method, and wherein the plurality of basic vectors are applied to the displayed image to correct a distortion in the displayed image.

* * * * *